United States Patent
Blangero et al.

(10) Patent No.: US 10,333,140 B2
(45) Date of Patent: Jun. 25, 2019

(54) COBALT-BASED LITHIUM METAL OXIDE CATHODE MATERIAL

(71) Applicants: Umicore, Brussels (BE); Umicore Korea Ltd., Chungcheongnam-do (KR)

(72) Inventors: Maxime Blangero, Chungcheongnam-do (KR); Da-In Choi, Chungcheongnam-do (KR); Shinichi Kumakura, Hyogo (JP)

(73) Assignees: UMICORE, Brussels (BE); UMICORE KOREA LTD., Chungnam (KR)

(*) Notice: Subject to any disclaimer, the term of this patent is extended or adjusted under 35 U.S.C. 154(b) by 50 days.

(21) Appl. No.: 15/738,219

(22) PCT Filed: Jun. 30, 2016

(86) PCT No.: PCT/IB2016/053920
§ 371 (c)(1),
(2) Date: Dec. 20, 2017

(87) PCT Pub. No.: WO2017/002057
PCT Pub. Date: Jan. 5, 2017

(65) Prior Publication Data
US 2018/0190976 A1 Jul. 5, 2018

Related U.S. Application Data

(60) Provisional application No. 62/187,882, filed on Jul. 2, 2015.

(30) Foreign Application Priority Data

Sep. 8, 2015 (EP) .................................. 15184259

(51) Int. Cl.
*H01M 4/36* (2006.01)
*C01G 51/00* (2006.01)
(Continued)

(52) U.S. Cl.
CPC ............. *H01M 4/366* (2013.01); *C01B 25/30* (2013.01); *C01G 51/42* (2013.01); *C01G 51/66* (2013.01);
(Continued)

(58) Field of Classification Search
CPC ...... H01M 4/366; H01M 4/131; H01M 4/525; H01M 4/5825; H01M 10/0525
See application file for complete search history.

(56) References Cited

U.S. PATENT DOCUMENTS

2006/0071198 A1  4/2006  Paulsen
2008/0261117 A1  10/2008 Iwanaga
(Continued)

FOREIGN PATENT DOCUMENTS

CN  103700843 A  4/2006
CN  103635431 A  3/2014
(Continued)

OTHER PUBLICATIONS

Du, Y.A., et al., "Li ion migration in Li3PO4 electrolytes: Effects of O vacancies and N substitutions", ECS Transactions, 2008, pp. 75-82, vol. 13, No. 26.
(Continued)

*Primary Examiner* — Jimmy Vo
(74) *Attorney, Agent, or Firm* — NK Patent Law

(57) ABSTRACT

A layered lithium metal oxide powder for a cathode material used in a rechargeable battery, with the general formula $(1-x)[Li_{a-b}A_b]_{3a}[Co_{1-c}M_c]_{3b}[O_{2-d-e}N'_e]_{6c} \cdot xLi_3PO_4$, with $0.0001 \le x \le 0.05$, $0.90 \le a \le 1.10$, $0 < b+c \le 0.1$, $-0.1 \le d \le 0.1$ and $e \le 0.05$, wherein A and M are one or more elements including at least one of the group consisting of Mg, Ti and Al; wherein N' is either one or more dopants of the group consisting of F, S, N and P; the powder consisting of a core and an ion-conductive electron-insulating surface layer, the
(Continued)

core having a layered crystal structure and the surface layer comprising a mixture of elements of the core material, oxides comprising either one or more elements of the group consisting of Mg, Ti and Al; and $Li_3PO_4$.

19 Claims, 15 Drawing Sheets

(51) Int. Cl.
*H01M 4/131* (2010.01)
*H01M 4/525* (2010.01)
*H01M 4/58* (2010.01)
*C01B 25/30* (2006.01)
*H01M 10/0525* (2010.01)
*H01M 10/052* (2010.01)
*H01M 4/02* (2006.01)

(52) U.S. Cl.
CPC ........... *H01M 4/131* (2013.01); *H01M 4/525* (2013.01); *H01M 4/5825* (2013.01); *H01M 10/0525* (2013.01); *C01P 2002/72* (2013.01); *C01P 2002/74* (2013.01); *C01P 2002/85* (2013.01); *C01P 2004/03* (2013.01); *C01P 2004/51* (2013.01); *C01P 2004/61* (2013.01); *C01P 2004/80* (2013.01); *C01P 2006/40* (2013.01); *H01M 10/052* (2013.01); *H01M 2004/028* (2013.01); *H01M 2220/30* (2013.01)

(56) References Cited

U.S. PATENT DOCUMENTS

| | | |
|---|---|---|
| 2012/0107691 A1 | 5/2012 | Lee et al. |
| 2014/0087266 A1 | 3/2014 | Li et al. |
| 2014/0106186 A1 | 4/2014 | Dudney |
| 2014/0212759 A1 | 7/2014 | Blangero |

FOREIGN PATENT DOCUMENTS

| | | |
|---|---|---|
| EP | 1137598 B1 | 5/2000 |
| JP | 2012099323 A | 5/2012 |
| JP | 2014523840 A | 9/2014 |
| JP | 2015015169 | 1/2015 |
| KR | 10-20140009526 A | 1/2014 |
| KR | 10-2015-0049288 | 5/2015 |
| WO | 200029331 | 5/2000 |
| WO | 2010139404 | 12/2010 |
| WO | 2012171780 A1 | 12/2012 |
| WO | 2013115336 | 8/2013 |
| WO | 2014104234 | 7/2014 |
| WO | 2015083901 | 6/2015 |

OTHER PUBLICATIONS

Mizushima, K., et al. LixCoO2 (0<x<-1): A new cathode material for batteries of high energy density, Materials Research Bulletin, vol. 15, No. 6 (1980), pp. 783-789.

Amatucci, G.G., et al. "Cobalt dissolution in LiCoO2-based non-aqueous rechargeable batteries", Solid State Ionics, vol. 83 (1996), pp. 167-173.

Amine, K., et al., "Mechanism of capacity fade of MCMB/Li [Ni1/3Mn1/3Co1/3I0.9O2] cell at elevated temperature and additives to improve its cycle life", Journal of Materials Chemistry, vol. 21 (2011), pp. 17754-17759.

Cheng, S.L., et al., "A study of the synthesis, characterization, and kinetics of vertical silicon nanowire arrays on (001) Si Substrates", J. Electrochem. Soc., (2008), vol. 155, Issue 11, pp. D711-D714.

Yoshio, M., et al., "A review of positive electrode materials for lithium-ion batteries", (2009), Publisher: Springer-Verlag, New York, pp. 9-48.

Levasseur, S., et al. "On the dual effect of Mg Doping in LiCoO2 and LiCoO2: Structural, Electronic Properties, and Li MAS NMR Studes", Chem. Mater., vol. 14, No. 8, (2002), pp. 3584-3590.

Popovic, L., et al., Raman spectroscopic study of phase transitions in Li3PO4, J. Raman Spectrosc., vol. 34 (2003), pp. 77-83.

Zhan, C., et al. "Mn(II) deposition on anodes and its effects on capacity fade in spinel lithium manganate-carbon systems", Nature Comm., vol. 4 (2013), p. 2437.

International Search Report for PCT/IB2016/053290, dated Oct. 12, 2016.

1a 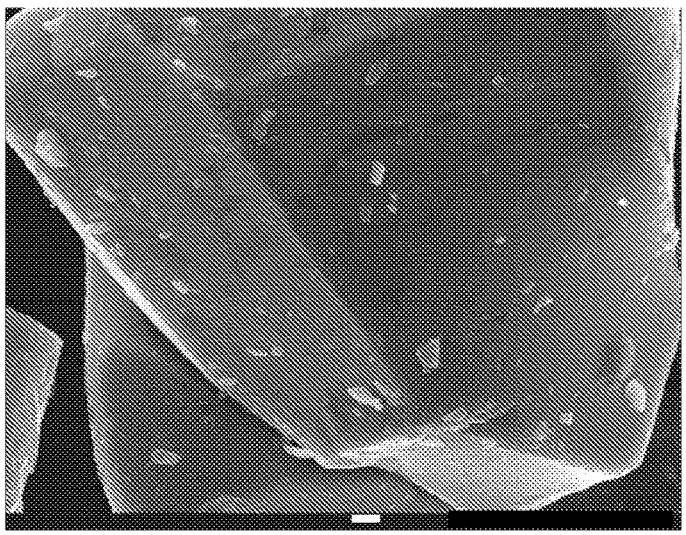
1b 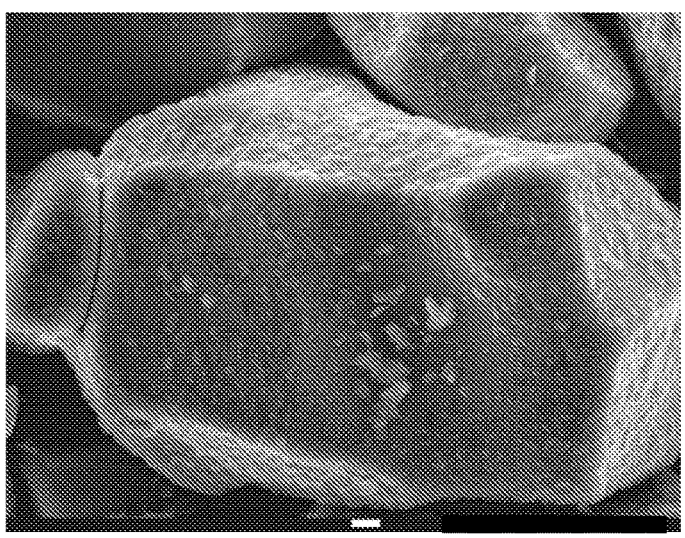
Figure 2

1c
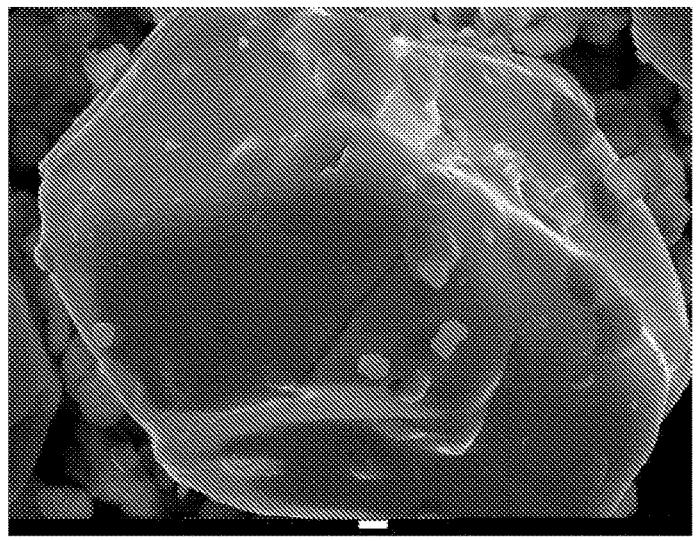
1d
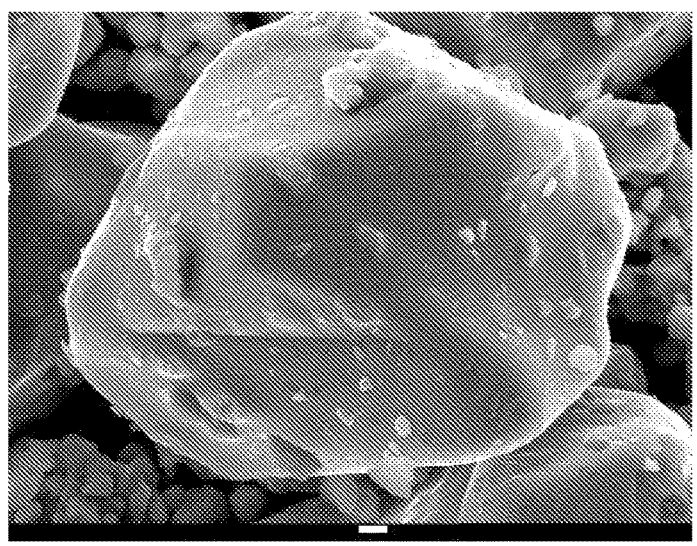
Figure 2 (continued)

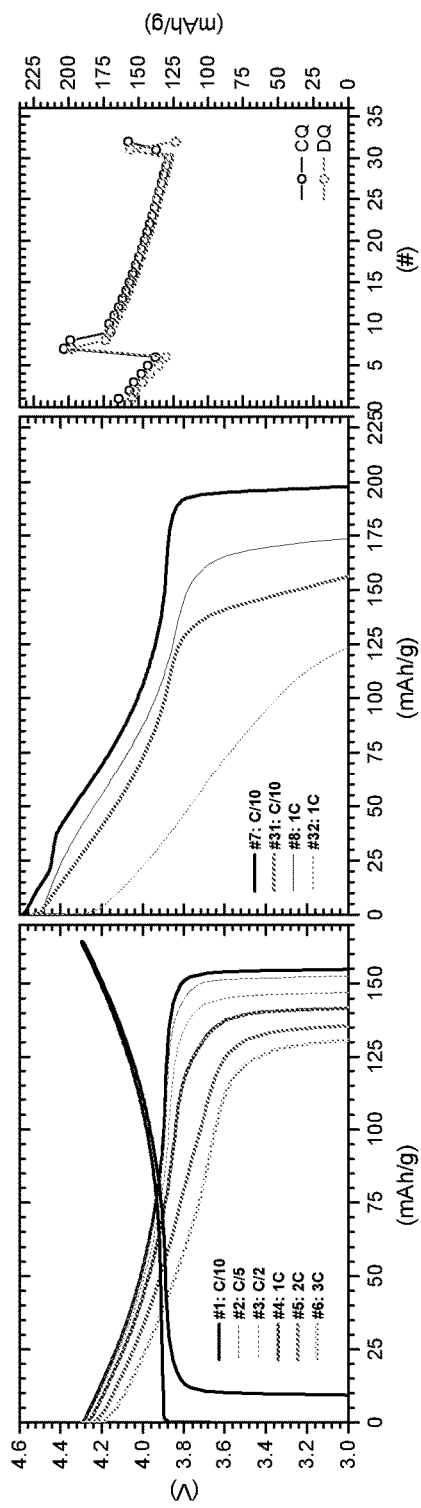
Figure 4_1
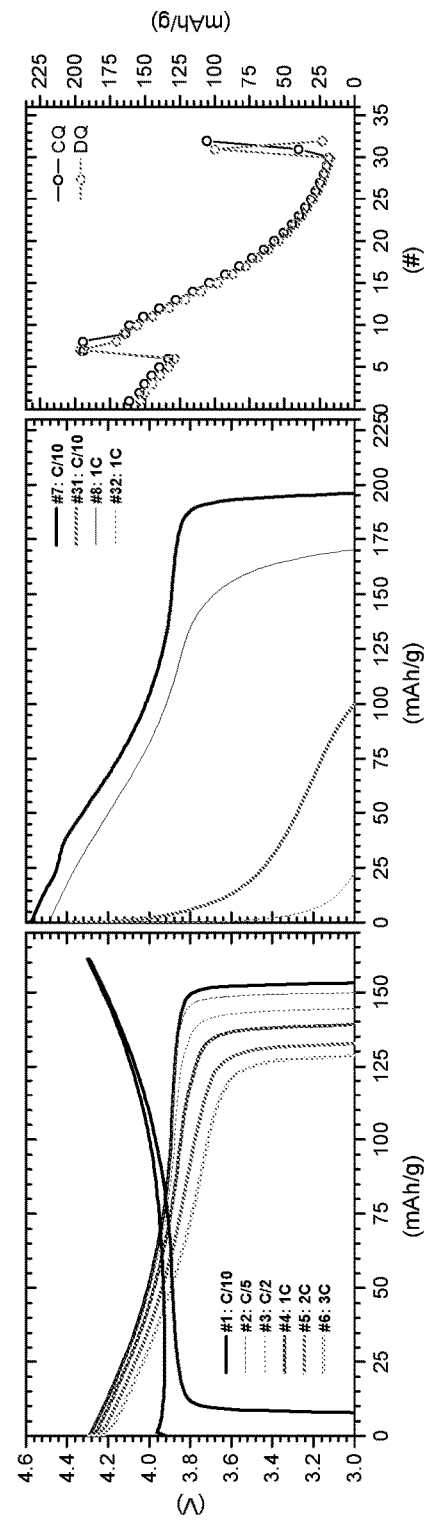
Figure 4_2

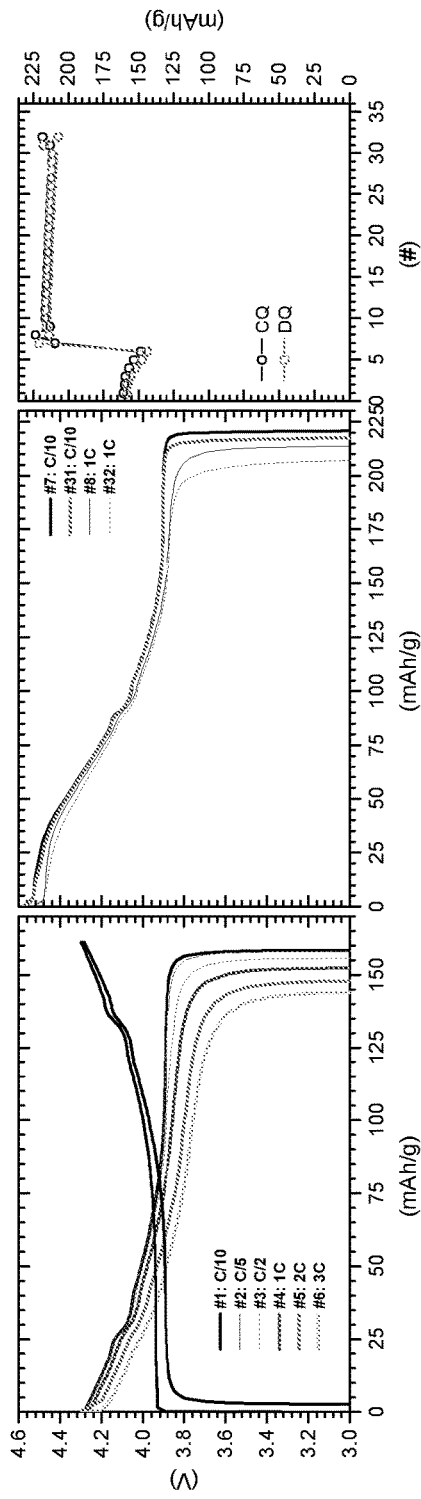
Figure 4_3
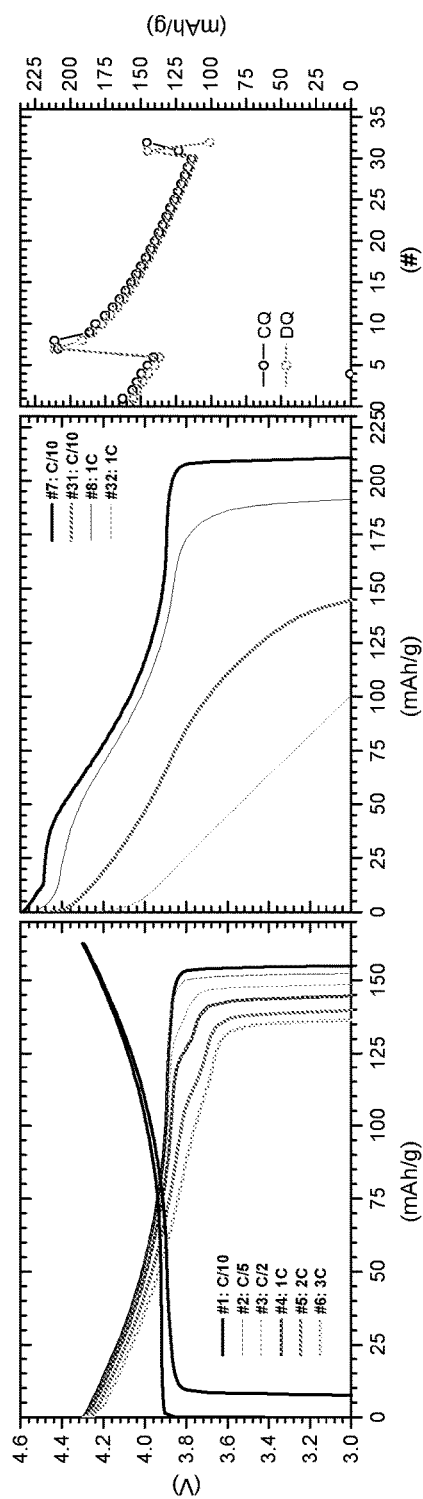
Figure 4_4

6a
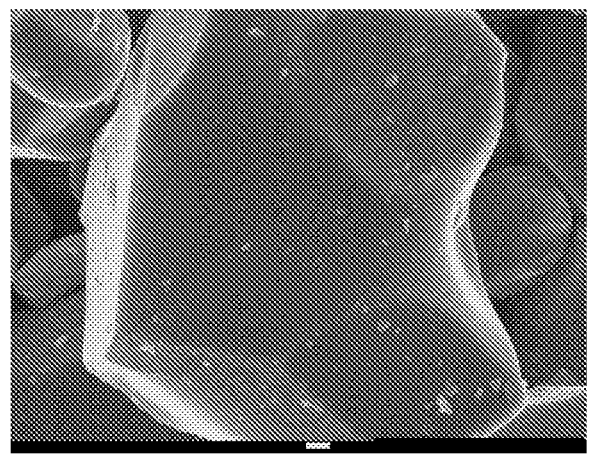
6b
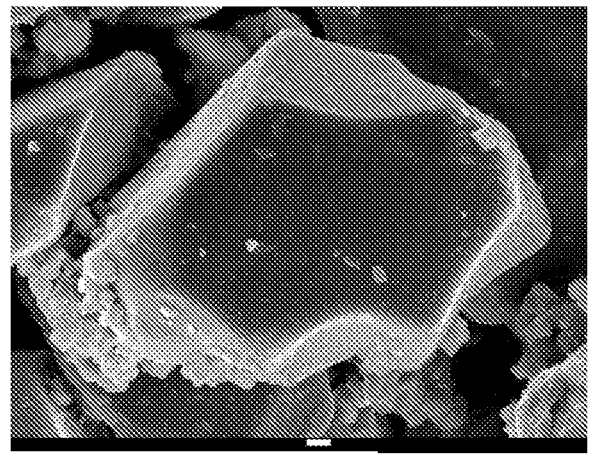
6c
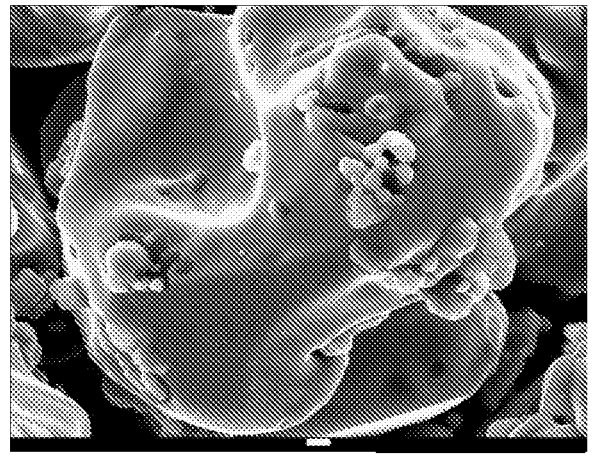
Figure 6 sample 3a
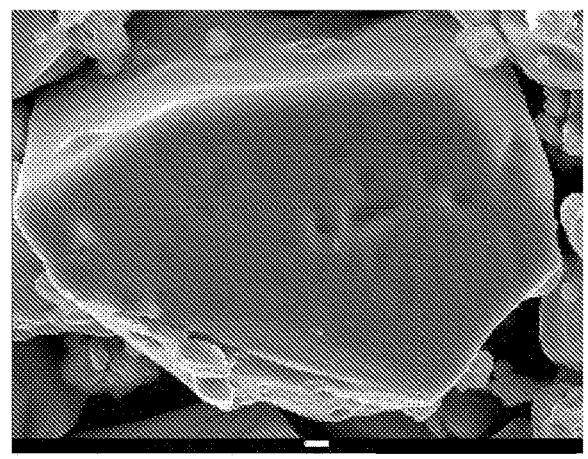
sample 3ac
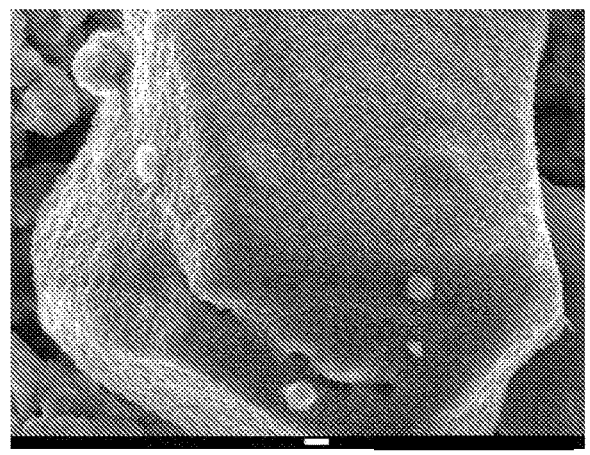
sample 3b
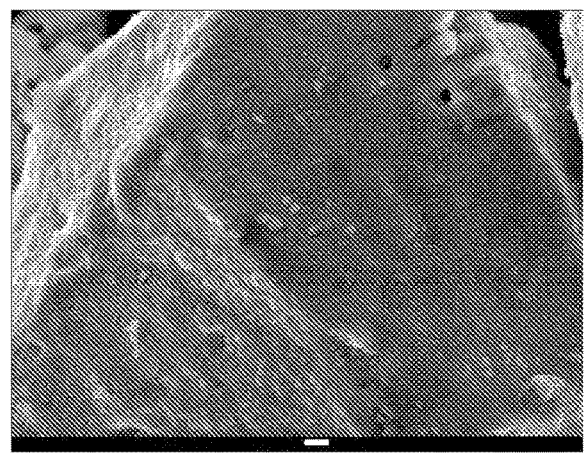
Figure 11 sample 3c
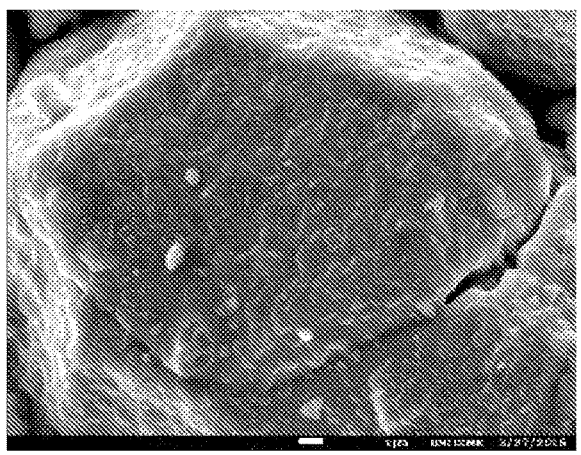
sample 3d
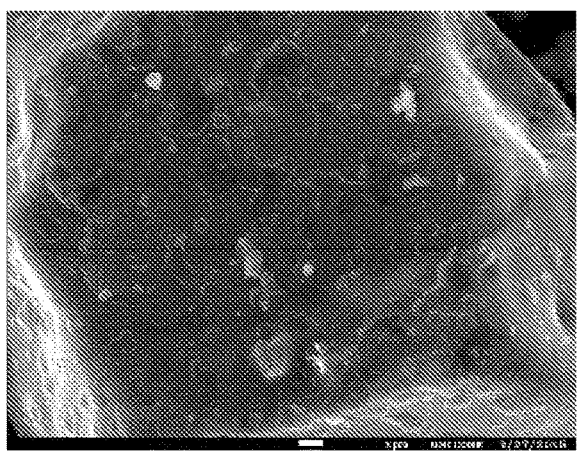
sample 3e
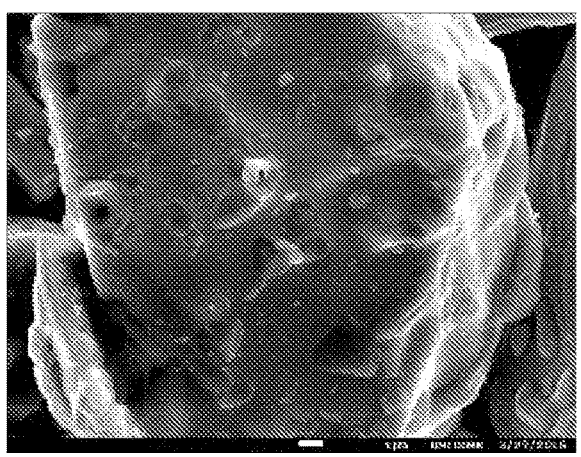
Figure 11 (continued)

COBALT-BASED LITHIUM METAL OXIDE CATHODE MATERIAL

This application is a National Stage application of International Application No. PCT/IB2016/053920, filed Jun. 30, 2016. This application also claims priority to U.S. Application No. 62/187,882, filed Jul. 2, 2015, and European Application No. EP15184259.8, filed Sep. 8, 2015.

TECHNICAL FIELD AND BACKGROUND

The present invention relates to a lithium cobalt-based oxide having a layered structure, for use as a cathode material in a rechargeable lithium-ion battery. The oxide has a core-shell configuration and is provided with doping elements, oxides and a dedicated coating layer.

Lithium cobalt oxide has served as an archetypal cathode material for secondary Li batteries ever since the discovery by Mizushima et al. in 1980 of its electrochemical properties. Lithium cobalt oxide-based materials have a layered structure alternating $CoO_2$ and $LiO_2$-slabs of edge-shared $CoO_6$ and $LiO_6$ octahedra along the 001 direction of the hexagonal unit cell (space group R-3m). Such a layered structure is ideally suited to reversibly accommodate lithium by de-intercalation and intercalation during battery charge and discharge, respectively. Due to their high energy density, rechargeable lithium and lithium-ion batteries can be used in a variety of portable electronics applications, such as cellular phones, laptop computers, digital cameras and video cameras. Commercially available lithium-ion batteries typically consist of graphite-based anode and $LiCoO_2$-based cathode materials. As today's consumer electronics demand rechargeable batteries with higher energy density, there is a surge towards $LiCoO_2$-based materials with increased energy density for more demanding end applications.

The energy density (in Wh/L) of $LiCoO_2$-based cathode materials is defined as the product of the average voltage during cycling (in V), the specific capacity (in mAh/g) and the gravimetric density (in $g/cm^3$). Effective approaches to improve the energy density include:

(a) increasing the packing density, which usually requires to increase the particle size of the powder particles, and (b) increasing the specific capacity by increasing the charge voltage. In a commercial cell, $LiCoO_2$ is usually cycled with an upper cutoff voltage of about 4.35 V with respect to a graphite anode, and gives a specific capacity of 164 mAh/g. To obtain a higher capacity from $LiCoO_2$, one must charge it to a potential above 4.35 V; typically 4.40V with a specific capacity of 172 mAh/g, and even up to 4.45V with a specific capacity of 182 mAh/g. However, repeated charge-discharge cycles using a higher upper cutoff voltage results in rapid capacity losses, thought to be caused by the structural instability of de-intercalated $LiCoO_2$, and by the increase in side reactions with electrolyte.

The industrial applicability of these two approaches is thus limited by side problems. The latter route is limited by the unstable behavior of the charged electrode materials in contact with electrolyte at higher voltage. As lithium is removed from $Li_xCoO_2$ (with x<1), changes in the electronic structure of $Li_xCoO_2$ occur, characterized by a strong electron charge transfer to the cobalt and oxygen, resulting in a strong electronic delocalization. Charged $Li_xCoO_2$ is a very strong oxidizer and has a highly reactive surface. The electrolyte is thermodynamically unstable in contact with such an oxidizing surface. A reaction with electrolyte, being the reducing agent, is strongly preferred energetically. Even at low temperature during normal cycling of a $LiCoO_2$ cathode at high voltage, this parasite reaction slowly but continuously proceeds. Reaction products cover the surface and electrolyte is decomposed, and both effects continuously result in a deterioration of the electrochemical performance of the battery whereby a loss of capacity and a strong increase of resistance (also known as polarization) is observed.

In addition, in "Solid State Ionic, 83, 167 (1996)", severe cobalt elution is reported for charged $Li_xCoO_2$. The cobalt dissolution increases exponentially when the charge potential increases from 4.1V up to 4.5V in a coincell with respect to the lithium anode, and cobalt is deposited onto the negative electrode in cobalt metal form. A direct correlation between the coincell capacity fade and cobalt dissolution was established in this voltage range. In "Journal of Materials Chemistry, 21 (2011) 17754-17759", Amine et al. emphasize that the dissolution of transition metal ions from the cathodes in Li-ion batteries is a detrimental phenomenon because these metal ions migrate from the cathode to the anode and are reduced to a metallic state onto the anode surface electrolyte interface (SEI). The metal or metal alloys deposited on the surface of the graphite anode has a negative effect on the stability of the SEI. Thus, this metal dissolution from the cathode and deposition onto the anode results in poor safety, poor cycling stability at higher voltage, and in poor storage properties of the charged cathode at elevated temperature. "J. Electrochem. Soc., 155, 711, (2008)" describes a mechanism where stray HF contained in electrolyte attacks $LiCoO_2$ and causes Co-dissolution.

A first conclusion of this prior art study is that achieving a lithium cobalt oxide with a functional surface preventing side reactions and metal dissolution is desirable. On the other hand, increasing the particle size to increase the packing density impairs the power capabilities of rechargeable batteries. In order to meet the power requirements, the battery as a whole and particularly the active cathode material itself must have a sufficient high rate performance. Increasing the mean particle size reduces the effective solid-state lithium diffusion kinetics which eventually results in lowered rate performance.

A careful study of published results on cathode materials allows a better understanding of the limitations of $LiCoO_2$ based rechargeable batteries. A fundamental limitation of state of the art $LiCoO_2$-based materials lies in the Li-excess and particle size dilemma. This dilemma is recalled in detail in Yoshio, M. et al. (2009). Lithium-Ion batteries. New York: Springer Science+Business Media LLC.: the higher the corresponding lithium excess, expressed as the molar ratio Li:Co>>1.00—typically Li:Co is around 1.05—used for the synthesis; the higher the packing density and the higher the particle size; the lower the specific surface area (or BET) and the higher the base content and the lower the electrochemical power properties. The mechanism behind $LiCoO_2$ particle growth and densification with increasing Li:Co is based on a so-called "lithium-flux effect" where the Li-excess acts as a flux agent enhancing the growth of $LiCoO_2$ particles which eventually increases the packing density. Such $LiCoO_2$ materials with dense and monolithic particle morphology are desirable to decrease the specific surface area and decrease the side-reaction area of the electrolyte with the cathode materials.

In WO2010-139404, the authors illustrate the relationship between packing density, mean particle size and lithium excess used for the preparation of state of the art Mg and Ti doped $LiCoO_2$. Typical packing densities of ca. 3.70 $g/cm^3$ are achieved for 18 µm particles. The authors emphasize that large pressed densities are preferable and obtained with monolithic, potato-shaped and non-agglomerated primary LiCoO$_2$ particles. However, the use of large Li:Co excesses to achieve larger monolithic particles results in poor electrochemical performances, with lower power (lower C-rate) and lower discharge capacity, which in return cancels the energy density gains achieved by increasing the particle size. These limitations in power and discharge capacity are resulting from two main factors: (i) a basic solid state diffusion limitation following a quasi-Fick-law (D~vL$^2$/t) as the particle size increases and (ii) introduction of structural defects with increasing Li-excess; for example as discussed by Levasseur in Chem. Mater., 2002, 14, 3584-3590 where the Li-excess is associated with Co substitution for Li in the CoO$_2$ layers and with oxygen deficiency Li$_{1+x}$Co$_{1-x}$O$_{2-x}$; further limiting the Li-ion diffusion mean free path within the particle. Last, such large Li:Co values also increase the pH, the free (or soluble) base content and the carbon content, which impairs safety, storage and bulging properties of charged cathodes.

In the prior art several approaches have been suggested to cope with these problems. They are usually associated with doping, coating or surface modification of LiCoO$_2$ based materials. Co substitution for elements such as Mg, Ti and Al and improvement of high voltage properties is for example described in EP1137598B1. Such doping prevents the structural collapse and improves the cycle stability and reversible capacity of LiCoO$_2$-based materials at high voltage. Industrial applicability is however limited as sintering of LiCoO$_2$ is prevented by Ti-doping and hence requires higher sintering temperature or larger Li-excess. To achieve high voltage stability, LiCoO$_2$ materials are usually coated (for example with Al$_2$O$_3$) or otherwise chemically modified (e.g. by providing a fluorinated surface). A problem is that coated dense LiCoO$_2$ particles often have larger polarization and lower Li-ion diffusion resulting in lower reversible capacity and poor rate performance, so that a part of the gain of energy density achieved by charging to higher voltage is annulled by a lower intrinsic capacity.

As a consequence, the current state of the art synthesis does not allow to achieve dense, monolithic LiCoO$_2$-based particles with superior energy density; electrochemical power and cycle life properties. Partial improvements and optimizations have been achieved, but the above mentioned basic problems have not yet been fully resolved. Hence there is clearly a need for high energy density LiCoO$_2$ based cathodes which can be cycled in a stable manner, namely by reducing side reactions and metal dissolution in real cells at higher voltages. It is an object of the present invention to define a cathode material for high end secondary battery applications having a high packing density, high rate performance, improved discharge capacity and showing high stability during extended cycling at high charge voltage.

SUMMARY

Viewed from a first aspect, the invention can provide the following product embodiments:

Embodiment 1

A layered lithium metal oxide powder for a cathode material used in a rechargeable battery, with the general formula (1−x)[Li$_{a-b}$A$_b$]$_{3a}$[Co$_{1-c}$M$_c$]$_{3b}$[O$_{2-d-e}$N'$_e$]$_{6c}$·xLi$_3$PO$_4$, with 0.0001≤x≤0.05, 0.95≤a≤1.10, 0<b+c≤0.1, −0.1≤d≤0.1 and e≤0.05, wherein the Li to Co+A+M+3P molar ratio is between 0.970 and 1.005, wherein A and M are one or more elements including at least one of the group consisting of Mg, Ti and Al; wherein N' is either one or more dopants of the group consisting of F, S, N and P; the powder comprising a core and a surface layer, the core having a layered crystal structure comprising the elements Li, Co and oxygen and having a molar ratio P to Co between 0 and less than 0.05, and the surface layer consisting of a mixture of the elements Li, Co and oxygen, the mixture further comprising electron insulating particles consisting of oxides comprising either one or more elements of the group consisting of Mg, Ti and Al, wherein the oxides may further comprise either one or both of Li and Co, and the mixture further comprising a plurality of ion conductive Li$_3$PO$_4$ particles in the form of discrete particles densely attached to the core. The Li to Co+A+M+3P molar ratio corresponds to [((1−x)·(a−b))+3x]/[((1−x)·(1+b))+3x]. In a further embodiment b>0 or c>0, or both b>0 and c>0. By "densely attached" is understood that the discrete particles cannot be separated from the core at all or at least without exercising considerable force, the opposite of particles that are only "loosely attached", e.g. by solid state mixing, and can be separated easily.

Embodiment 2

In the general formula:

$$0.970 \le [((1-x)\cdot(a-b))+3x]/[((1-x)\cdot(1+b))+3x] \le 1.000.$$

Embodiment 3

In the general formula:

$$0.970 \le [((1-x)\cdot(a-b))+3x]/[((1-x)\cdot(1+b))+3x] \le 0.990.$$

In these embodiments, by limiting the range for the Li to Co+A+M+3P molar ratio to 1.000 or even 0.990 better results in the electrochemical tests are achieved, as will be shown below.

Embodiment 4

In the powder Li$_3$PO$_4$ is attached to the surface of the cores in a combination of a film layer and discrete particles, thereby creating an ion-conductive electron-insulating layer on the cores.

Embodiment 5

In the powder the Li$_3$PO$_4$ particles may have a size below 5 μm, and preferably below 1 μm.

Embodiment 6

The lithium metal oxide powder of embodiment 4, wherein the Li$_3$PO$_4$ that is present as a film may cover at least 50% of the surface of the core.

Embodiment 7

In embodiment 4, the film may have a thickness less than 10 nm but >0 nm.

Embodiment 8

In the powder, the Li$_3$PO$_4$ may be a crystalline compound.

Embodiment 9

In the powder, the Li$_3$PO$_4$ may have up to 25 at % nitrogen doping on oxygen site.

Embodiment 10

In embodiment 4, the thickness of the ion-conductive electron-insulating surface layer, defined as the depth where the molar ratio of (A+M)/Co>[(b+c)/(1−c) multiplied by 2] mol/mol, as determined by XPS, is 1 μm or less, but >0 μm. In the overall formula of the powder, the molar ratio of (A+M)/Co is expressed by (b+c)/(1−c). As A and M are segregated to the surface layer, the depth of this layer can be defined as the region where the molar ratio (A+M)/Co is more than twice the value in the general formula. In the surface layer the molar contents of A, M and Co are measured by using XPS (X-ray photoelectron spectroscopy).

Embodiment 11

The lithium metal oxide powder of embodiment 10, wherein the thickness is 0.5 μm or less, but >0 μm.

Embodiment 12

In the general formula of the powder, A may comprise—besides at least one of the group consisting of Mg, Ti and Al—at least one element selected from the group consisting of Na, Si, S, K, Ca, V, Cr, Mn, Fe, Ni, Cu, Zn, Sr, Nb, Zr, W, F and rare earth metals.

Embodiment 13

In the general formula M may further comprise—besides at least one of the group consisting of Mg, Ti and Al—at least one element selected from the group consisting of Li, Na, Si, S, K, Ca, V, Cr, Mn, Fe, Ni, Cu, Zn, Sr, Nb, Zr, W, F and rare earth metals.

Embodiment 14

The powder has an electronic conductivity at room temperature below $10^{-3}$ S/cm, or below $10^{-4}$ S/cm, or even below $10^{-5}$ S/cm.

Embodiment 15

In the general formula the P/Co molar ratio is between 0.01 and 5 mol %.

Embodiment 16

In the general formula the Li/(Co+3P) molar ratio is between 0.980 and 1.020.

Embodiment 17

The powders may have a soluble base content <20 μmol/g, preferably <15 μmol/g, and more preferably <12 μmol/g.

It is clear that further product embodiments according to the invention may be provided by combining individual features that are covered by the different product embodiments described before.

Viewed from a second aspect, the invention can provide the following method embodiments:

Embodiment 18

A method for manufacturing the lithium metal oxide powder described before, comprising the steps of:
providing a first mixture of a first Co— or Co, A and M-comprising precursor powder and a first Li-comprising precursor powder, the first mixture having a Li:Co molar ratio >1.02, or even >1.04,
sintering the first mixture in an oxygen comprising atmosphere at a temperature T1 of at least 350° C., or at least 600° C., or even at least 900° C., thereby obtaining a Li-enriched lithium metal oxide compound,
providing a second Co— or Co, A and M-comprising precursor powder and a phosphate containing reagent,
mixing the Li-enriched lithium metal oxide compound, the second Co— or Co, A and M-comprising precursor powder, and the phosphate containing reagent, thereby obtaining a second mixture wherein the Li to Co+A+M+3P molar ratio is between 0.970 and 1.005,
sintering the second mixture in an oxygen comprising atmosphere at a temperature T2 of at least 600° C. This temperature may also be set between 700 and 1000° C., or between 850 and 950° C. To the second mixture a second Li-comprising precursor powder can be added before the sintering step at T2. The Li-comprising precursor powder in this method may be $Li_2CO_3$. In this process embodiment, it may also be that the step of mixing the Li-enriched lithium metal oxide compound, the second Co— or Co, A and M-comprising precursor powder, and the phosphate containing reagent, thereby obtaining a second mixture wherein the Li to Co+A+M+3P molar ratio is between 0.970 and 1.005, is modified as follows: no A and M-comprising precursor powder is added to the second mixture, and the second mixture is dried or spray-dried, whereby $Li_3PO_4$ particles are precipitated on the solids in the mixture. Thereafter the A and M-comprising precursor is added to obtain a third mixture wherein the Li to Co+A+M+3P molar ratio is between 0.970 and 1.005, followed by the final sintering step.

Embodiment 19

A method for manufacturing the lithium metal oxide powder described before, comprising the steps of:
providing a first mixture of a first Co— or Co, A and M-comprising precursor, and a first Li-comprising precursor powder, the first mixture having a Li:Co molar ratio >1.01, or even >1.04,
sintering the first mixture in an oxygen comprising atmosphere at a temperature T1 of at least 350° C., or at least 600° C., or even at least 900° C., thereby obtaining a Li-enriched lithium metal oxide compound,
mixing the Li-enriched lithium metal oxide compound with phosphate and lithium containing reagents, thereby precipitating $Li_3PO_4$ particles (flakes) on the surface of the Li-enriched lithium metal oxide compound and obtaining a second mixture,
providing a second Co— or Co, A and M-comprising precursor powder, and
mixing the second mixture and the second Co— or Co, A and M-comprising precursor powder, thereby obtaining a third mixture, whereby the third mixture has a Li to Co+A+M+3P molar ratio between 0.970 and 1.005, sintering the third mixture in an oxygen comprising atmosphere at a temperature T2 of at least 600° C., or even at least 700° C. This temperature may also be set between 700 and 1000° C., or between 850 and 950° C. To the third mixture a second Li-comprising precursor powder can be added before the sintering step at T2. The Li-comprising precursor powder in this method may be $Li_2CO_3$. As the phosphate and lithium containing reagents are normally contained in liquids, the second mixture may first be dried before the dry second Co— or Co, A and M-comprising precursor powder is added to obtain the third mixture. In process embodiment 19, it may also be that a Co precursor powder is mixed with the Li-enriched lithium metal oxide compound, the phosphate and the lithium containing reagents, thereby obtaining an intermediate mixture that is then spray-dried, thereby precipitating $Li_3PO_4$ particles (flakes) on the mixture of Co precursor powder and Li-enriched lithium metal oxide compound resulting in the second mixture, after which only A and M-comprising precursor powder is added to obtain the third mixture, followed by sintering. In the different process embodiments, the A and M-comprising precursor may comprise an Al-oxide, i.e. $Al_2O_3$, and may also comprise either one of MgO and $Ti_2O_3$. The Co precursor may be $Co_3O_4$.

Viewed from a third aspect, the invention can provide in embodiment 20 the use of the lithium metal oxide powder of described before in either one of a Li-ion, a Li-polymer or a solid state secondary battery (also known as SSB).

BRIEF DESCRIPTION OF THE DRAWINGS

FIG. 2: FESEM of Core_1 (FIG. 1*a*), Core_2 (FIG. 1*b*), sample 1c (FIG. 1*c*) and 1e (FIG. 1*d*);

FIG. 4_1: coincell evaluation of Core_1;

FIG. 4_2: coincell evaluation of Core_2;

FIG. 4_3: coincell evaluation of sample 1c;

FIG. 4_4: coincell evaluation of sample 1 g;

FIG. 6: FESEM of Core_3 (FIG. 6*a*), Core_4 (FIG. 6*b*) and sample 2a (FIG. 6*c*);

FIG. 9*a*: EDS surface mapping of sample 2a;

FIGS. 9*b* and 9*c*: EDS surface mapping and spatial distribution of Co (9b) and P (9c) of sample 2a;

FIG. 10: EDS map sum spectrum of sample 2a;

FIG. 11: SEM image at 5000× magnification of samples 3a, 3ac, 3b, 3c, 3d and 3e;

In FIGS. 2, 6 & 11 the magnification is ×5000, whereby the white bar represents 1 µm.

DETAILED DESCRIPTION

Figure 1:
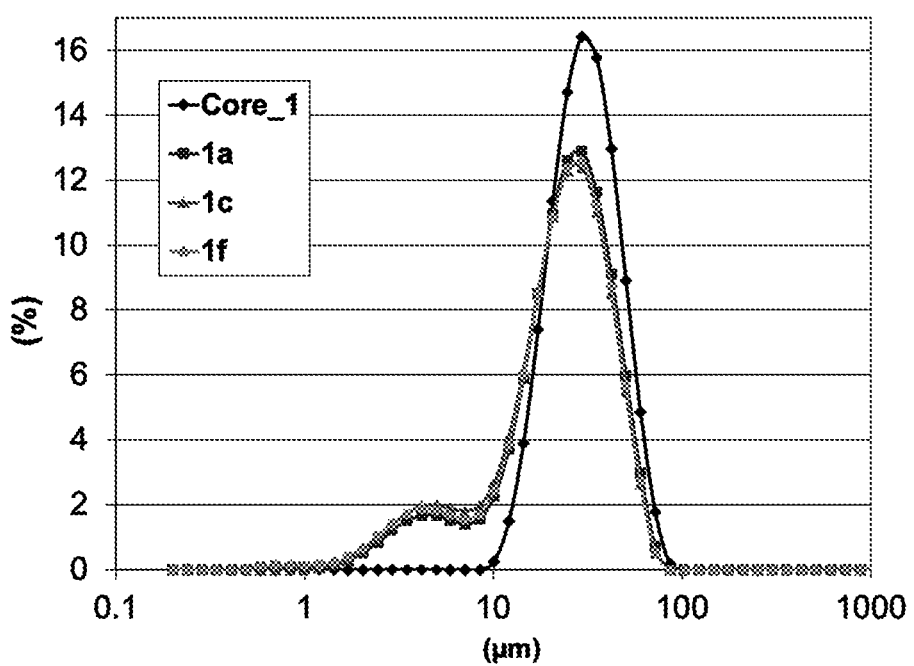
FIG. 1: Particle size distribution of Core_1 and examples 1a, 1c and 1f.

The current invention discloses a $LiCoO_2$-based positive active material for a lithium secondary battery having high energy density and that retains superior cycle stability at high voltage. Viewed from a first aspect, the invention can provide a lithium metal oxide powder for a cathode material in a rechargeable battery, with the general formula $(1-x)[Li_{a-b}A_b]_{3a}[Co_{1-c}M_c]_{3b}[O_{2-d-e}N'_e]_{6c}\cdot xLi_3PO_4$, where the letters added after [ ] represent sites, with $0.0001 \leq x \leq 0.05$, $0.90 \leq a \leq 1.10$, $0 < b+c \leq 0.1$ and $-0.1 \leq d+e \leq 0.1$ wherein A and M are one or more elements including at least one of the group consisting of Mg, Ti and Al. Lithium cobalt oxide based materials are layered materials with rhombohedral symmetry (space group R-3m with a~2.8(1)Å and c~14.1(1)Å) and are isostructural to α-$NaFeO_2$. In such a structure, Li and Co ions occupy octahedral sites from the oxygen close-packing and order: Li ions preferentially occupy (x,y,z)=(0,0,0) crystallographic sites (3a Wyckoff position), Co ions preferentially occupy (0,0,1/2) (3b Wyckoff position) and O ions occupy (0,0,z) (6c Wyckoff position). A is a dopant on 3a sites, is selected from Na, Mg, Al, Si, S, K, Ca, Ti, V, Cr, Mn, Fe, Ni, Cu, Zn, Sr, Nb, Zr, W, F and rare earth metals, and is at least one of the group consisting of Mg, Ti and Al. M is a dopant on 3b sites, is selected from Li, Na, Mg, Al, Si, S, K, Ca, Ti, V, Cr, Mn, Fe, Ni, Cu, Zn, Sr, Nb, Zr, W, F and rare earth metals, and is at least one of the group consisting of Mg, Ti and Al. N' is a dopant on 6c sites and is selected among F, S, N and P. In particular, Li doping on metal site (3b sites) has been reported for such layered cobalt-based structures, and is known to result in oxygen deficiency; typically up to 0.1 Li ions can occupy 3b sites, resulting in about 0.1 oxygen deficiency. We have found that the electrochemical performances of the materials of the present invention are strongly improved when the (Li):(Co+M+A+3P) molar ratio is between 0.970 and 1.005, preferably between 0.970 and 1.000. When the molar ratio is greater than 1.005, electrochemical properties, mainly cycle stability at high voltage are degraded. On the other hand for values below 0.970, the material's specific capacity is significantly reduced. These considerations indicate that the $(1-x)[Li_{a-b}A_b]_{3a}[Co_{1-c}M_c]_{3b}[O_{2-d-e}N'_e]_{6c}\cdot xLi_3PO_4$ materials must have $0.970 \leq [((1-x)\cdot(a-b))+3x]/[((1-x)\cdot(1+b))+3x] \leq 1.005$, preferably $0.97 \leq [((1-x)\cdot(a-b))+3x]/[((1-x)\cdot(1+b))+3x] \leq 1.000$ stoichiometry ratio to work best.

The materials of the present invention comprise a second phase $Li_3PO_4$; being present in crystalline state or amorphous state, or a combination of both crystalline and amorphous states. There are two well-characterized crystalline polymorphs of $Li_3PO_4$ which are recognized as β (space group Pmn2$_1$) and γ (space group Pnma, Pmnb or Pcmn depending on the xyz axis referential choice). An a form is mentioned in the literature, [Popović et al., *J. Raman Spectrosc.*, 34, 77 (2003)] but its crystal structure has not been fully elucidated yet. The β form can irreversibly transform to the γ form at temperatures exceeding the range of 400 to 600° C. In γ-$Li_3PO_4$, lithium ions occupy two distinct crystallographic sites identified as 8d and 4c, phosphor is in 4c and oxygen occupies three distinct sites marked 8d and two 4c when using Wyckoff positions. Doping of $Li_3PO_4$ by A elements is possible and results in $Li_3P_{1-x}A_xO_4$ compounds that are isostructural to $Li_3PO_4$. Also $Li_3PO_4$ compounds with N (nitrogen element) partially substituting for O—at least up to 25 at %—are also possible and result in compounds $Li_{3-\alpha}PO_{4-\beta}N_\gamma$ with $-1 \leq \alpha \leq 1$, $0 < \beta \leq 1$ and $0 < \gamma \leq 1$ isostructural to $Li_3PO_4$. $Li_3PO_4$ features relatively high Li-ion conductivity and good electrochemical stability up to 4.7V vs. Li/Li$^+$, for example Kuwata et al., *ECS Trans.*, 16, 53 (2009) reported an electronic conductivity of $4.5 \times 10^{-7}$ S/cm at 25° C. suitable to be used as potential electrolyte for All Solid-State Li Ion Secondary Batteries (SSB).

The amount of $Li_3PO_4$ expressed by the molar ratio P/Co may be between 0.01 mol % and 5 mol %; when the amount is below 0.01 mol %, no effect is observed on electrochemical properties, and when the amount exceeds 5 mol %, the specific capacity of the cathode materials is strongly decreased. Materials of the present invention may also include secondary compounds in the form of oxides comprising one or more A, M, Li and Co elements. Typical examples are, but not limited to, $Li_2O$, $Li_2SO_4$, $Li_2TiO_3$, MgO, CoO, $Mg_{1-x}Co_xO$, $Co_3O_4$, $Co_{3-x}Mg_xO_4$, $Li_2ZrO_3$, $Li_{1+x}Ni_{1-x}O_2$, . . . LiF may also be present. In an embodiment the amount of secondary phase does not exceed 5 at %; if the amount is too high, then the specific capacity of the cathode materials is strongly reduced.

The cathode material of the present invention consists of a core and an ion-conductive electron-insulating surface layer, the core having a layered crystal structure and the surface layer comprising a mixture of elements of the core, oxides comprising either one or more elements of the group consisting of Mg, Ti and Al; and $Li_3PO_4$. The local side reactions (reduction of electrolyte, cobalt elution . . . ) on the material's particle surface require the simultaneous presence of a lithium cation and an electron. The lithium cation is present in the electrolyte and the electron in the cathode bulk. If however an electron-insulating layer physically separates the electrons in the cathode bulk from the lithium cations in the electrolyte, then further electrolyte reduction is not possible. If an electronically insulating cathode material could be successfully cycled then one would expect a high voltage stability because the oxidation of the electrolyte requires that an electron is supplied to the cathode. It is however conventional wisdom that a cathode with relatively lower electronic conductivity cannot have good electrochemical performance. Obviously, a cathode materials bearing an electron-insulating and ion-conducting surface will solve this problem. This issue is addressed by the materials of the present invention by providing such functionalized particle surface, being composed of the elements of the core, especially Li and Co, and electron-insulating oxides that may also be lithiated and have Co in their formula.

The electronic conductivity of $LiCoO_2$ is in the range of $10^{-2}$ to 1 S/cm at room temperature (as is discussed in US2012/0107691 A1). The materials of the present invention have very low electronic conductivity, with conductivity values at least 1 ($\sim 10^{-3}$ S/cm) to 3 ($<10^{-5}$ S/cm) orders of magnitude lower than state of the art lithium cobalt oxide based products, whilst still retaining an excellent lithium ion conductivity. The authors believe that the co-existence of low electronic conductivity and high ionic conductivity is an important feature of the present invention and the resulting synergies allow to achieve a superior high voltage stability of the cathode materials. That such low-conductivity $LiCoO_2$-based cathodes can result in excellent electrochemical performance is surprising because it is commonly accepted that a relatively high electronic conductivity is needed for the Li cation diffusion within the cathode particles and across the interface between electrolyte and cathode particles.

A Li-ion conducting $Li_3PO_4$ compound is attached to the surface of the core in the form of a film layer, discrete particles or a combination of a film layer and discrete particles. In one embodiment the $Li_3PO_4$ compound is densely attached to the particle and covers the surface homogeneously. In at least two embodiments, the authors suspect the co-existence of a plurality of $Li_3PO_4$ particles, with a typical diameter below 5 μm, densely attached to the lithium cobalt oxide based particle combined with a film homogeneously covering the particles with a thickness typically in the range of 0.01 to 20 nm (determined from XPS and vs. $SiO_2$). Such distribution and morphology of $Li_3PO_4$ compound is particularly desirable as the authors have observed that as a consequence, the metal (cobalt) dissolution is strongly suppressed at high voltage. The authors suspect that the $Li_3PO_4$ coating layer fulfills several functions in addition to providing a good ionic conductivity, such as the absorption of water in the electrolyte that lowers HF level, HF scavenging, and the protection of the active materials from deteriorating side reactions with the electrolyte. It is crucial to recall at this stage that only the combination of an electron-insulating and an ion-conductive surface allows achieving superior cycle stability and improved (suppressed) metal dissolution at high voltage.

A, M and N' elements appear to be segregated (from the core), with a radial gradient doping distribution from the surface to the core of the particles, as evidenced by XPS. In at least two embodiments, the authors observe that the atomic ratio of A and M elements over Co exceeds the nominal content $(b+c)/(1-c)$ within a depth of approximately 500 nm (from the surface, and determined by XPS vs. $SiO_2$). That such A, M and N' elements are segregated and are found in larger concentration at the surface of the particles is particularly desirable. The authors suspect that, for example, in the case of Mg, Ti and Al, because of the stable nature of the Mg—O, Ti—O and Al—O metal-oxygen bonds, structural stability of the surface layer in contact with an electrolyte is improved, and allows for improved capacity retention during extensive cycling at high voltage. In addition to doping the layered phase, one or more elements of the list of A and M and elements from the core (Li and Co) could also exist as secondary phases; these secondary phases are likely densely attached to the surface of the particles. Examples of secondary phases of elements from the list of A and M are, but not limited to, $Li_2O$, LiF, $Li_2SO_4$, $Li_2TiO_3$, MgO, CoO, $Mg_{1-x}Co_xO$ with $0 \leq x \leq 1$, $Co_3O_4$, $Co_{3-x}Mg_xO_4$ with $0 \leq x \leq 1$, $Li_2ZrO_3$, $Li_2MgZrO_4$, $Li_{1+x}Ni_{1-x}O_2$ with $0 \leq x \leq 1$, $Co_2MgO_4$, $Li_2TiO_3$, $ZrO_2$, $SiO_2$, $Al_2O_3$, $LiAlO_2$, $Li_2SiCoO_4$, . . . . As most of these elements are electrochemically inactive and to keep the specific capacity of the active materials high; it is important to keep the amount of secondary phases below 5% by weight, preferably less than 2.5% by weight.

Such secondary phases are believed to be densely attached to the particle surface and accumulate within 1 to 100 nm depth.

N' elements are selected from the list of F, S, N and P. It is for example anticipated that when F is partially substituting O and because of the strong and stable nature of the Co—F and Li—F bound; the electrochemical stability at high potential regarding parasite reactions (electrolyte decomposition) of the cathode materials is improved.

In some embodiments, the core material particles have a monolithic morphology and have an average particle size D50>10 μm, or D50>15 μm or even >20 μm. It is particularly desirable that the core materials feature such dense and monolithic morphology, as the pressed density is improved and the Brunauer-Emmett-Teller (BET) surface area is controlled and below 0.5 m$^2$/g. In other embodiments the particle size distribution has a bimodal profile with mixtures of fines and large particles, the amount of fine particles being typically between 1 and 25 wt %, or even between 10 to 20 wt %, and the mode ratio between the large and fine particles is at least above 3 μm/μm, even above 4 μm/μm and or even above 5 μm/μm. Such strategies allow some of the embodiments to reach a pressed density of at least 3.5 g/cm$^3$, or even at least 3.7 g/cm$^3$.

Viewed from a second aspect, the invention can provide the process methods described before. In a particular embodiment, the process comprises the steps of:
  providing a first mixture of first Co-, Ti- and Mg-oxides, and a first Li-comprising precursor powder, the first mixture having a Li:Co molar ratio >1.05,
  sintering the first mixture in an oxygen comprising atmosphere at a temperature of at least 350° C., or at least 600° C., or even at least 900° C., thereby obtaining a Li-enriched lithium metal oxide compound,
  precipitating $Li_3PO_4$ flakes on the surface of the Li-enriched lithium metal oxide compound,
  mixing the Li-enriched lithium metal oxide compound carrying $Li_3PO_4$ flakes with a second mixture of second Co-, Ti- and Mg-oxides, and a second Li-comprising precursor powder, thereby obtaining a third mixture, the third mixture having a Li to Co+Ti+Mg+3P molar ratio is between 0.970 and 1.005, preferably between 0.985 and 1.000, and
  sintering the third mixture in an oxygen comprising atmosphere at a temperature of at least 600° C., or even at least 900° C. The precipitation may be obtained by immersing the Li-enriched lithium metal oxide compound in water, adding an aqueous solution of a lithiated phosphate compound, such as $LiH_2PO_4$ and LiOH, followed by the evaporation of the water in a dryer or by spray-drying.

The methods of the invention where during a first sintering step a lithium super-stoichiometric mixture is formed, and in a second step the Li that is in excess is consumed by reacting with the second Co comprising precursor to form lithiated cobalt oxide and by reacting with the phosphate containing reagent to form $Li_3PO_4$, result in the complex surface structure consisting of a heterogeneous mixture of the elements Li, Co and oxygen, the mixture further comprising electron insulating particles consisting of oxides comprising either one or more elements of the group consisting of Mg, Ti and Al, wherein the oxides may further comprise either one or both of Li and Co, and the mixture further comprising a plurality of ion conductive $Li_3PO_4$ particles in the form of discrete particles densely attached to the core. Where the Li to metal ratio after first sintering step is not lowered during the second sintering step, such a surface layer with segregated A and M oxides is not formed. As will be shown in the Examples, the powder having this complex core-surface layer structure exhibit better electrochemical results than prior art powders. It is also shown that the Li to Co+A+M+3P molar ratio has a direct influence on these results.

A an M precursors are preferably powders with micron or sub-micron size, such as but not limited to $TiO_2$, MgO, $Al_2O_3$, ZnO, $ZrO_2$, $Li_2ZrO_3$, $Li_2TiO_3$, . . . . Examples of phosphate containing reagents, include, but are not limited to, $Li_3PO_4$, $LiPO_3$, $H_3PO_4$, $Li_{3-x}H_xPO_4$ with $0 \leq x \leq 3$, $(NH_4)_3PO_4$, $H(NH_4)_2PO_4$, $H_x(NH_4)_3-PO_4$ with $0 \leq x \leq 3$ . . . . Such phosphate containing reagents are particularly suitable to be applied by wet impregnation, precipitation or methods such as spray coating, nozzle spraying after dispersion in aqueous medium. Other A and M and phosphate containing reagents are possible, such as $AlPO_4$, LISICON compounds with general formula $M'PO_4$— where M' contains one or more metals selected from M—such as, but not limited to, $Li_{1+x}Ti_{2-x}Al_x(PO_4)_3$ with $0 \leq x \leq 1$ and $LiTi_{2-x}Zr_x(PO_4)_3$ with $0 \leq x \leq 2$. In these cases, powders of such reagent with micron size, or even sub-micron size can be used in above processes.

A key aspect in the process is in controlling the annealing temperature of the mixture of the phosphate containing reagent with the lithium metal oxide compound. The annealing may be performed at a temperature ranging from 350° C. up to 1100° C. Preferably, annealing is carried out in the range of 600° C. up to 1100° C. in order to densely attach the $Li_3PO_4$ compound to the surface of the $LiCoO_2$-based material particles.

In summary, this invention discloses a unique strategy to design positive active materials, having an ion-conductive electron-insulating surface preventing direct contact of an electrolyte and the highly reactive core surface at high voltage (typically 4.6V vs. Li-metal) that suppresses parasite reactions (electrolyte oxidation, metal elution . . . ), and featuring superior capacity, capacity fading and energy fading at high voltage (typically 4.6V vs. Li-metal). In addition, the highly ion-conductive electron-insulating positive active material's surface allows a fast Li-ion transfer reaction whereby the irreversible capacity is strongly reduced, and the rate performance is strongly improved. Such enhanced electrochemical properties are highly desirable when the above described materials are fitted into a Li-ion, Li-polymer or all solid Li-ion secondary battery (SSB).

The invention is further illustrated in the examples below, wherein the following experimental methods are used:

Inductively coupled plasma optical emission spectroscopy (ICP-OES) is performed on an Agilent ICP-720ES in order to determine the elemental composition of the cathode materials.

Scanning Electron Microscopy (SEM) is carried out using a JEOL JSM 7100F scanning electron microscope. The electron microscope is fitted with a 50 mm$^2$ X-Max$^N$ EDS (Energy-dispersive X-ray spectroscopy) sensor from Oxford instruments.

X-ray diffraction is carried out using a Rigaku D/MAX 2200 PC diffractometer equipped with a Cu (K-Alpha) target X-ray tube and a diffracted beam monochromator at room temperature in the 15 to 85 2-θ degree range. The lattice parameters of the different phases are calculated from the X-ray diffraction patterns using full pattern matching and Rietveld refinement methods.

Electrical conductivity is measured on a Mitsubishi MCP-PD51 powder resistivity measurement system equipped with a Loresta GP MCP-T610 multi-meter in the 4-probe configuration. The electrical conductivity that is measured directly on the powder corresponds to the electrical conductivity of the surface layer. The measurement is carried out on powderous cathode materials under an applied pressure of 63.7 MPa.

The residual $Li_2CO_3$ and LiOH base content is a material surface property that can be quantitatively measured by the analysis of reaction products between the surface and water. If powder is immersed into water a surface reaction occurs. During the reaction the pH of the water increases (as basic compounds dissolve) and the base is quantified by a pH titration. The result of the titration is the "soluble base content" (SBC). The content of soluble base can be measured as follows: 100 ml of de-ionized water is added to 20 g of cathode powder, followed by stirring for 10 minutes. Care is taken to prevent air exposure by closing the flask during the stirring period, as $CO_2$ uptake from the air can happen and falsify the result. The aqueous solution is then removed by using Buchner filtration with suction, thereby achieving >90 g of clear solution which contains the soluble base. The content of soluble base is titrated by logging the pH profile during addition of 0.1 M HCl at a rate of 0.5 ml/min until the pH reaches 3 under stirring. A reference voltage profile is obtained by titrating suitable mixtures of LiOH and $Li_2CO_3$ dissolved in low concentration in DI water. In almost all cases two distinct plateaus are observed. The upper plateau with endpoint $\gamma_1$ (in mL) between pH 8~9 is $OH^-/H_2O$ followed by $CO_3^{2-}/HCO_3^-$, the lower plateau with endpoint $\gamma_2$ (in mL) between pH 4~6 is $HCO_3^-/H_2CO_3$. The inflection point between the first and second plateau $\gamma_1$ as well as the inflection point after the second plateau $\gamma_2$ are obtained from the corresponding minima of the derivative dpH/dVol of the pH profile. The second inflection point generally is near to pH 4.7. Results are then expressed in LiOH and $Li_2CO_3$ weight percent and for SBC in μmol/g.

The pressed density is measured as follows: 3 grams of powder is filled into a pellet die with a diameter "d" of 1.300 cm. A uniaxial load of 2.8 tons, corresponding to a pressure of 207 MPa, is applied for 30 seconds. After relaxing the load down to 7.4 MPa (100 kg uniaxial load), the thickness "t" of the pressed powder is measured. The pellet density is then calculated as follows: $3/(\pi \times (d/2)^2 \times t)$ in $g/cm^3$.

The particle size distribution is measured using a Malvern Mastersizer 2000 with Hydro 2000MU wet dispersion accessory after dispersing the powder in an aqueous medium. In the PSD, the D50 value is the median for the volume distribution, i.e. the size in microns that splits the distribution with half above and half below this diameter. D10 and D90 values are defined by analogy.

Electrochemical properties in coincells are measured as follows. Coincell electrodes are prepared as follows: about 27.27 wt. % of active cathode material, 1.52 wt. % polyvinylidene fluoride polymer (KF polymer L #9305, Kureha America Inc.), 1.52 wt. % conductive carbon black (Super P, Erachem Comilog Inc.) and 69.70 wt. % N-methyl-2-pyrrolidone (NMP) (from Sigma-Aldrich) are intimately mixed by means of high speed homogenizers. The slurry is then spread in a thin layer (typically 100 micrometer thick) on an aluminum foil by a tape-casting method. After evaporating the NMP solvent, the cast film is processed through a roll-press using a 40 micrometer gap. Electrodes are punched from the film using a circular die cutter measuring 14 mm in diameter. The electrodes are then dried overnight at 90° C. The electrodes are subsequently weighed to determine the active material loading. Typically, the electrodes contain 90 wt. % active materials with an active materials loading weight of about 17 mg (~11 mg/cm²). The electrodes are then put in an argon-filled glove box and assembled within a 2325-type coin cell body. The anode is a lithium foil having a thickness of 500 micrometers (origin: Hosen); the separator is a Tonen 20MMS microporous polyethylene film. The coin cell is filled with a 1M solution of $LiPF_6$ dissolved in a mixture of ethylene carbonate and dimethyl carbonate in a 1:2 volume ratio (origin: Techno Semichem Co.). Each cell is cycled at 25° C. using Toscat-3100 computer-controlled galvanostatic cycling stations (from Toyo). The coin cell testing schedule used to evaluate Core_1, Core_2 and samples 1a to 1g is detailed in Table 4. This schedule uses a 1 C current definition of 160 mA/g and comprises 2 parts as follows:

(i) Part I is the evaluation of rate performance at 0.1 C (full discharge in 10 hr), 0.2 C, 0.5 C, 1 C (1 C corresponding to a full discharge in 1 hr), 2 C and 3 C in the 4.3~3.0V/Li metal window range. With the exception of the 1st cycle where the initial charge capacity CQ1 and discharge capacity DQ1 are measured in constant current mode (CC), all subsequent cycles feature a constant current-constant voltage during the charge with an end current criterion of 0.05 C. A rest time of 30 minutes for the first cycle and 10 minutes for all subsequent cycles is allowed between each charge and discharge. The irreversible capacity Qirr. is expressed in % as:

$$Q_{Irr.} = \frac{(CQ1 - DQ1)}{CQ1} \times 100 \ (\%).$$

The rate performance at 0.2 C, 0.5 C, 1 C, 2 C and 3 C is expressed as the ratio between the retained discharge capacity DQn, with n=2, 3, 4, 5 and 6 for respectively nC=0.2 C, 0.5 C, 1 C, 2 C and 3 C as follows:

$$nC - \text{rate} = \frac{DQn}{DQ1} \times 100 \ (\%), \text{ e.g. } 3C - \text{rate} = \frac{DQ6}{DQ1} \times 100 \ (\%).$$

(ii) Part II is the evaluation of cycle life at 0.5 C. The discharge capacity at 4.6V/Li metal is measured at 0.1 C at cycle 7 and at 1 C at cycle 8. Capacity fadings at 0.1 C and 1 C are calculated as follows and are expressed in % per 100 cycles:

$$0.1C \ QFad. = \left(1 - \frac{DQ31}{DQ7}\right) \times \frac{10000}{25} \text{ in \%/100 cycles,}$$

$$1C \ QFad. = \left(1 - \frac{DQ32}{DQ8}\right) \times \frac{10000}{25} \text{ in \%/100 cycles.}$$

Energy fadings at 0.1 C and 1 C are calculated as follows and are expressed in % per 100 cycles. $\overline{Vn}$ is the average voltage at cycle n.

$$0.1C \ EFad. = \left(1 - \frac{DQ31 \times \overline{V31}}{CQ7 \times \overline{V7}}\right) \times \frac{10000}{25} \text{ in \%/100 cycles,}$$

$$1C \ EFad. = \left(1 - \frac{DQ32 \times \overline{V32}}{CQ8 \times \overline{V8}}\right) \times \frac{10000}{25} \text{ in \%/100 cycles.}$$

Float Charge Method:

In a recent technical report of commercially available "3M battery electrolyte HQ-115", a float charging method is used to test the stability of novel electrolyte at high voltage. The method is carried out by continuously charging LCO/graphite pouch cells or 18650 cells at 4.2 V and 60° C. for 900 hours. The currents recorded under charge are compared. A higher current reflects more side reactions that occur, so this method is able to identify parasite reactions occurring in a battery at high voltage. In "*Energy Environ. Sci.*, 6, 1806 (2013)", a similar float charging method is used to evaluate the stability of electrolyte against oxidation under high voltage from 5V and up to 6.3V vs. Li metal. Based on the above knowledge, by choosing a relatively stable electrolyte and anode materials for the required charging voltage, float charge methods can be used to study the stability of cathode materials under high voltage, where the metal dissolution from the cathode materials can be reflected by the leakage current. In addition, in "*Nature Comm.*, 4, 2437 (2013)", the dissolved manganese from lithium manganese oxide cathode is deposited on the surface of the anode in metal or metal alloy form, and the deposited amount can be detected by inductively coupled plasma-atomic absorption spectrometry (ICP). This ICP experiment on the anode can also be used to study the metal dissolution issue of lithium cobalt oxide-based material. Therefore, the float charge method associated with ICP measurement (referred to hereafter as "floating experiment") is a feasible way to evaluate the side reaction and metal dissolution of lithium cobalt oxide-based cathode materials at high voltage and elevated temperature.

In the present study, floating experiments are performed in order to evaluate the stability of cathode materials at high voltage charging and at elevated temperature (50° C.). In some embodiments, the tested cell configuration are coincells that are assembled as follows: two separators (from SK Innovation) are located between a positive electrode (previously described) and a negative graphite electrode (Mitsubishi MPG). The electrolyte is 1M $LiPF_6$ in EC/DMC (1:2 volume ratio) solvents. The prepared coincells are submitted to the following charge protocol: the coincell is firstly charged to a defined upper voltage (4.45V vs. graphite) at constant current mode with a C/20 rate taper current (with 1 C=160 mAh/g), then is kept at constant 4.45V voltage (CV-mode) for 120 hours at 50° C. After the floating experiment, the coincell is disassembled. The anode and the separator in contact with the anode are analyzed by ICP-OES for metal dissolution analysis.

X-ray photoelectron spectroscopy (XPS): XPS measurements are carried out in a Quantera SXM™ from ULVAC-PHI (Q2). The measurements are performed using monochromatic AlKα-radiation and a spot size of 100 μm (100 Watt) scanning across an area of 1200×500 μm$^2$. The measurement angle θ is 450; at this setting the information depth is approximately 7 nm. By means of wide-scan measurements the elements present at the surface are identified. Accurate narrow-scans are performed to determine the precise surface composition. Concentration—depth profiles are determined by alternating measurements and ion bombardment (Argon ions, $V_i$=4 kV, raster 3.6×3.6 mm$^2$, sputter rate in $SiO_2$: 8.8 nm/minute. In other materials the sputter rate will be different). Standard sensitivity factors are used to convert peak areas to atomic concentrations. As a result, it is possible that the concentrations deviate from reality in the absolute sense. In sputter depth profiles deviations might be larger due to preferential sputtering effects. The detection limit of the different elements is typically 0.1 at %; meaning that elements with atomic concentration below 0.1 at % will not be observed by means of XPS and their presence with concentration <0.1 at % cannot be excluded.

Example 1

This example will demonstrate that materials comprising $LiCoO_2$-based particles bearing an electron insulating surface and comprising ion-conducting crystalline $Li_3PO_4$ have superior electrochemical behavior compared to state of the art lithium cobalt oxides.

Sample preparation: Ti and Mg doped $LiCoO_2$-base materials are prepared at mass-production scale using a mixture of $Li_2CO_3$, $Co_3O_4$, $TiO_2$ and MgO in a Li/Co/Ti/Mg molar ratio of 1.075/0.9967/0.0008/0.0025. The product is placed in a ceramic tray and sintered at a temperature of 990° C. for 10 h in air. The product is then crushed and classified resulting in a median volumetric particle size D50 of about 28 μm, as shown on FIG. 1. The pressed density of the powder is 3.90 g/cm$^3$. The as-prepared sample is referred to as Core_1. SEM images of Core_1 samples are shown on FIG. 2 (reference: 1a).

Next, 1 mol % $Li_3PO_4$ is applied on the surface of Core_1 as follows: an amount of powder of Core_1 is immersed in de-ionized water in a 5:2 weight ratio and continuously stirred. An aqueous solution of 1.02 mol/L $LiH_2PO_4$ and an aqueous solution of 2.04 mol/L LiOH are simultaneously added dropwise at a rate of 1 mL/min. The water is then evaporated in a dryer at 90° C. As a result, $LiH_2PO_4$ is precipitated into $Li_3PO_4$ particles and deposited on the surface of the Core-1 particles. The as-prepared sample is referred to as Core_2. SEM images of Core_2 samples are shown on FIG. 2 (reference: 1b), and show that Core_2 particles are homogeneously covered by flakes of precipitated $Li_3PO_4$ with a typical length size of approximately 500 nm.

Next, sample 1a is prepared as follows: an amount of powder of Core_2 is mixed with fine $Co_3O_4$ powder (with typical D10, D50 and D90 particle sizes in volume, determined from the cumulative volume particle size distribution, in the range of D10<3 μm, D50=3~5 μm and D90<10 μm commercially available from Umicore) in a molar ratio of (Core_2):Co($Co_3O_4$)=0.8696:0.1304, and MgO and $TiO_2$ are added too, in order to achieve an overall Co/Ti/Mg molar composition of 0.9925/0.0025/0.0050. 97.74 wt % of the above described mixture and 2.26 wt % of $Li_2CO_3$ are further blended together. The as-prepared blend is put in a ceramic crucible and fired at 980° C. for 12 h in air. The sintered product is then crushed and classified, resulting in sample 1a. Sample 1b is prepared in a similar way as sample 1a, except that 2.63 wt % $Li_2CO_3$ is added. Sample 1c is prepared in a similar way as sample 1a, except that 2.99 wt % $Li_2CO_3$ is added. Sample 1d is prepared in a similar way as sample 1a, except that 3.17 wt % $Li_2CO_3$ is added. Sample 1e is prepared in a similar way as sample 1a, except that 3.35 wt % $Li_2CO_3$ is added. Sample 1f is prepared in a similar way as sample 1a, except that 3.71 wt % $Li_2CO_3$ is added. Sample 1g is prepared in a similar way as sample 1a, except that 4.07 wt % $Li_2CO_3$ is added.

The particle size distribution of Core_1 and samples 1a, 1c and 1e is shown on FIG. 1 and their D5, D50 and D90 values are given in Table 1. Core_1 shows a symmetric particle size distribution with a D50 close to 28 μm. Examples 1a, 1c and 1e feature a bimodal particle size distribution with a first mode near 4 μm and resulting from the introduction of fine $Co_3O_4$ particle reagent, and a second mode near 28 μm ascribed to Core_1. In such configuration; the mode ratio between large and fine particles is about 7. The results of chemical ICP analyses are listed on Table 2. Very good agreement is found between the targeted and experimental Mg, Ti and P contents. Both the Li:Co and Li:(Co+3P) ratio increase when the wt % of $Li_2CO_3$ added increases for samples 1a to 1g. The Li:(Co+3P) ratio is close to 1 for samples 1c, 1d and 1e.

Results and Discussion:
FESEM Analyses:
FIG. 2 shows the SEM images of the Core_1, Core_2 and samples 1c and 1e with 5000× magnification. Core_1 surface is smooth. Core_2 image shows the homogeneous precipitation and deposition of $Li_3PO_4$ flakes on the surface of the particles. Images of samples 1c and 1e show that the particle surface recovers a smooth aspect after heat treatment. Fine particles observed on the images of samples 1c and 1e are originating from $Co_3O_4$ (D50~3 μm) addition.

Figure 3:
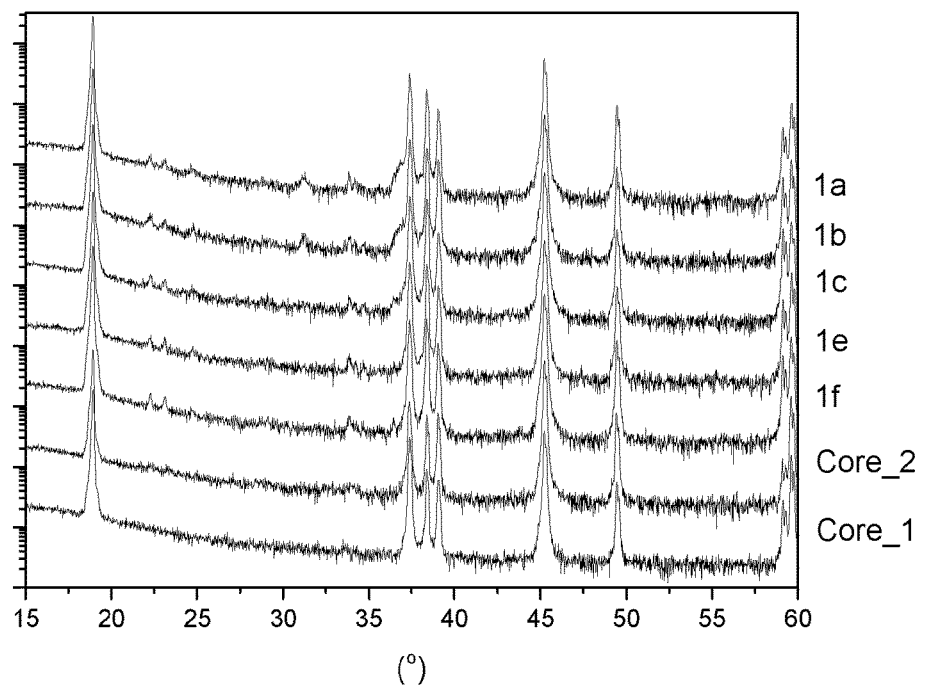
FIG. 3: XRD of Core_1, Core_2 and samples 1a, 1b, 1c, 1e and 1f. Reflected intensity in Log 10 scale (in a.u.) is shown in the 15°-60° 2-θ range.

XRD Analyses:

FIG. 3 shows the XRD patterns of Core_1, Core_2 and samples 1a, 1b, 1c, 1e and 1f. Diffracted intensity is displayed in logarithmic scale for clarity. All XRD patterns are dominated by the typical reflections of a well crystallized hexagonal layered O3-type $LiCoO_2$ phase with lattice parameters a=2.817 Å and c=14.057 Å in R-3m space group. Core_2 XRD pattern shows the extra presence of weak and broad peaks at 22.3 and 23.1 2-theta degrees that are characteristic of $Li_3PO_4$ (120) and (101) reflections; as expected after precipitation of $Li_3PO_4$ on Core_1 particle surface. For all samples 1a to 1g, well defined peaks attributed to the $Li_3PO_4$ phase are observed and are indexed using an orthorhombic lattice with a=6.14 Å, b=10.48 Å and c=4.93 Å parameters with Pmnb space-group. These unit cell parameters correspond to the "γ" polymorph of $Li_3PO_4$. For samples 1a and 1b; impurity peaks of a spinel $Co_3O_4$ phase are observed. Such spinel peaks are not observed for samples 1c to 1g where a larger amount of $Li_2CO_3$ has been added to the blend. This means that not enough lithium is available in the blend to convert the spinel $Co_3O_4$ reagent into an O3-type layered oxide in samples 1a and 1b. Full conversion of the spinel $Co_3O_4$ reagent into an O3-type layered oxide is achieved as of sample 1c; this observation is in line with ICP titration data showing that sample 1c has a Li:Co and Li:(Co+3P) molar ratio close to 1.00.

Conductivity:

Table 1 lists the electrical conductivity of Core_1, Core_2 and samples 1a to 1g. Core_1 and Core_2 have electronic conductivities above $10^{-3}$ S/cm and in line with values reported for doped $LiCoO_2$. The conductivity is going through a minimum for sample 1c and is 3 orders of magnitude lower than Core_1 and 1 g samples. Such dramatic drop in conductivity is surprising and unexpected for $LiCoO_2$-based materials.

Soluble Base Content pH Titration:

Table 1 lists the residual LiOH and $Li_2CO_3$ amounts (in wt %) and SBC determined by pH-titration for samples 1a to 1g. The soluble base content decreases rapidly from samples 1 g to 1c where it reaches a minimum value of 9.9 μmol/g. The LiOH wt % follows the same behavior and is minimal for 1 C with 0.0002 wt %. The $Li_2CO_3$ soluble content decreases rapidly and then stabilizes near 0.3~0.35 wt % from sample 1a to 1d.

Pressed Density:

Table 1 lists the pressed density of Core_1 and samples 1a to 1g. The pressed density of samples 1a to 1g is about 0.1 g/cm³ higher than Core_1. This pressed density increase is the result of a particular modification of the particle size distribution; namely the introduction of a bimodal feature in order to fill interstitial sites between large Core_1 particles with smaller particles and hence the increase of packing density. It is well known in crystallography that, assuming a uniform and ideal close packing of spherical particles with radius "r"; octahedral, tetrahedral and trigonal interstitial sites are only accessible to finer particles with a maximum radius of 0.414×r, 0.225×r and 0.155×r, respectively. Applying such considerations to samples 1a to 1g; being a mixture of large particles (originating from Core_1) with about 14 μm radius and finer particles (originating from $Co_3O_4$) with about 1.5 to 2.5 μm radius; all of octahedral, tetrahedral and trigonal interstitial sites—with radius of 5.8, 3.2 and 2.2 μm respectively—are accessible. As a result filling of interstitial sites allows for larger packing density for samples 1a to 1g compared to Core_1.

XPS:

The list of detected elements on sample 1c is shown on Table 6. Some organic C (peak near 284.8 eV) is present at the surface of the samples. This is normal for samples that have been stored in ambient air. The cobalt $2p_{1/2}$ XPS peaks at 795 eV is characteristic of $Co^{3+}$ ions of $LiCoO_2$ and exclude a significant presence of $Co^{2+}$ at the surface of the particles within the XPS at % resolution and sensitivity. A well resolved Mg 2p XPS peak around 49.5 eV is observed for sample 1c; typical for Mg in oxygen environment such as MgO or Mg-comprising phosphates. From the blend composition, the expected nominal Mg/Co atomic ratio is 0.0050/0.9925=0.0054. The Mg/Co atomic ratio on the particle surface of sample 1c measured by XPS is 1.4/9.4=0.1489 and is more than 27 times the expected nominal Mg/Co atomic ratio in the blend. Likewise, a well resolved Ti 2p peak is observed near 458 eV. These binding energies are in good agreement with the exclusive presence of $Ti^{4+}$ in six-fold oxygen environments as found in compounds like $TiO_2$ and $Li_2TiO_3$ or Ti-comprising phosphates. From the blend composition, the expected nominal Ti/Co atomic ratio is 0.0025/0.9925=0.0025. The Ti/Co atomic ratio on the particle surface of sample 1c measured by XPS is 2.0/9.4=0.2127 and is about 2 orders of magnitude higher than the expected nominal Ti/Co atomic ratio.

Figure 13:
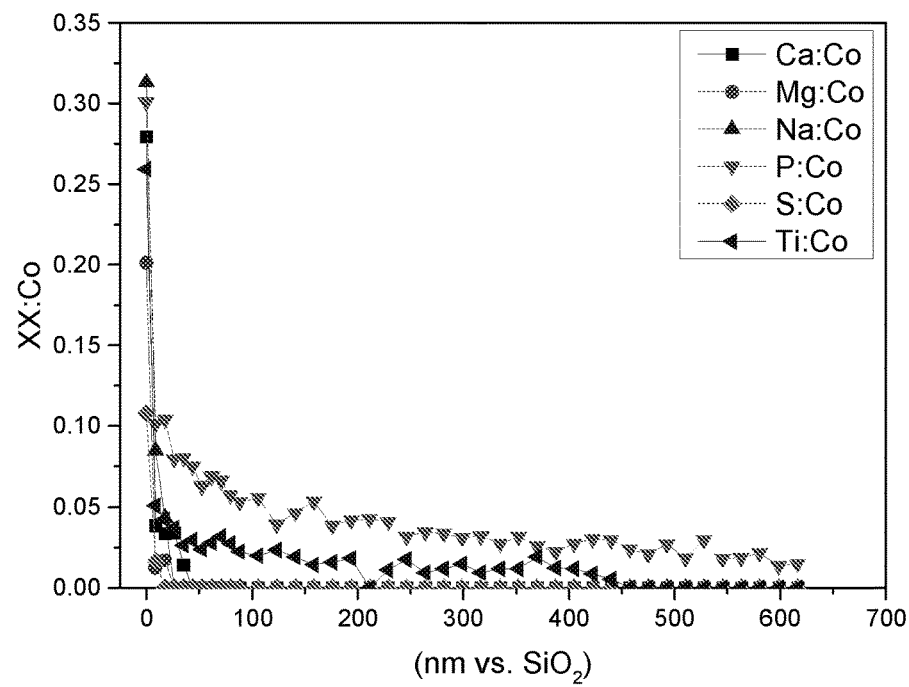
FIG. 13: XPS depth profiling of sample 1c. The element content XX=[Ca, Mg, Na, P, S, Ti] over Co molar ratio is plotted as function of depth (sputter rate vs. $SiO_2$ and equal to 8.8 nm/min)

A P 2p peak is observed around 133.6 eV and is characteristic of $-PO_4^{3-}$ groups. Again, the P/Co atomic ratio on the particle surface of sample 1c measured by XPS is 2.1/9.4=0.2234 and is about 1 order of magnitude higher than the expected nominal P/Co atomic ratio. The evolution of the Ca, Mg, Na, P, S and Ti over Co molar ratio as a function of particle depth has been monitored for sample 1c by means of XPS depth profiling, as shown on FIG. 13. S, Mg, Na and Ca over Co molar ratios go to "0" below 50 nm of sample 1c's particle surface, suggesting that the atomic content of these elements is below the detection limit of XPS. Likewise, the Ti/Co molar ratio decreases and is equal to "0" near 450 nm depth, suggesting that the atomic content of Ti is below the detection limit of XPS. The large difference between expected nominal and surface XPS Mg and Ti over Co atomic ratios suggests that the Mg and Ti atomic distributions are not homogeneous and are segregated: the surface of the particles of sample 1c is enriched in Mg and Ti compared to the core, whilst the elements of the core are still present. Such elemental segregation is an explanation for the electron insulating behavior of sample 1c. The phosphate distribution decreases rapidly between 0 and 50 nm depth and then monotonously until 600 nm, the core of the material having a P to Co molar ratio below 0.05 mol/mol. The fast initial decrease could possibly be explained by a very thin layer of phosphate compound, such as $Li_3PO_4$, homogeneously covering the surface; the typical thickness is inferior to 20 nm and thought to be in the range of 0.01 to 10 nm. The linear decrease between 50 and 600 nm is most likely resulting from large $Li_3PO_4$ particles attached on the surface of sample 1c, as evidenced by SEM and XRD.

Figure 5:
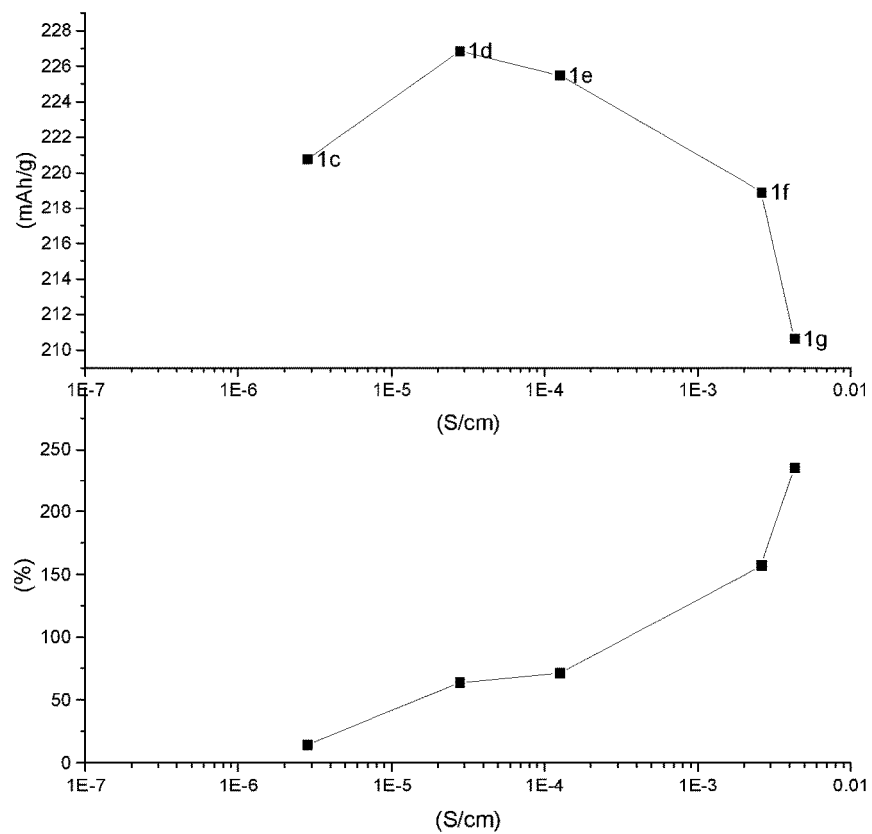
FIG. 5: evolution of 1 C energy fading (bottom, %) and 4.6V discharge capacity (top, mAh/g) for samples 1c-1g.

Coincells:

Table 3 shows the coincell properties of Core_1 and Core_2 and samples 1a to 1g. FIGS. 4_1, 4_2, 4_3 and 4_4 show the detailed coincell profiles for Core_1, Core_2, samples 1c and 1 g, respectively. In each of the left Figures the rate performance is given in cycles 1-6, from right to left evidently. In each of the middle Figures the capacity fading is shown, comparing cycles 7 to 31 and 8 to 32, with from right to left cycles 7, 8, 31 and 32; except in FIG. 4_3 where the order of the cycles is 7, 31, 8 and 32. In each of the right Figures the cycle stability is shown, the discharge capacity DQ being slightly below the charge capacity CQ. Core_1 shows current state of the art electrochemical performances at both at 4.3V for CQ1, DQ1 and rate performance, and at 4.6V for cycle stability. These performances are poor and do not allow operating such state of the art materials at 4.6V with decent performances. $Li_3PO_4$ coated Core_2 performances are even poorer with strong acceleration of 4.6V capacity and energy fading. The electrochemical performances of samples 1a to 1g are remarkable in many aspects and bring tremendous improvements compared to state of the art lithium cobalt oxide-based materials. The electrochemical performances continuously improve from samples 1 g, 1f, 1e, 1d to 1c where the CQ_1, CQ_7 and 3 C rate continuously increases and the QIrr., QFad. and Efad. at 0.1 C and 1 C are minimized. Samples 1c to 1a show a stabilization of the electrochemical properties and retain an outstanding level of performance. FIG. 5 shows the evolution of DQ_7 and 1 C Efad. as a function of electronic conductivity. DQ_7 is maximum for sample 1d, with a conductivity $<10^{-4}$ S/cm. 1 C Efad. is continuously decreasing and minimal for sample 1c, with a conductivity $<10^{-5}$ S/cm.

Example 2

This example will demonstrate that materials comprising $LiCoO_2$-based particles bearing an electron insulating surface and comprising ion-conducting crystalline $Li_3PO_4$ have a superior electrochemical behavior compared to electron insulating-only materials.

Sample preparation: Ti and Mg doped $LiCoO_2$-base materials are prepared at mass-production scale using a mixture of $Li_2CO_3$, $Co_3O_4$, $TiO_2$, MgO in a Li/Co/Ti/Mg molar ratio of 1.060/0.9967/0.0008/0.0025. The product is placed in a ceramic tray and sintered at a temperature of 990° C. for 10 h in air. The product is then crushed and classified which resulted in a median particle size in volume D50 of about 18 μm. The as-prepared sample is referred to as Core_3. FIG. 6a shows the SEM image of Core_3.

Next, 1.85 mol % $Li_3PO_4$ is applied on the surface of Core_3 as follows: first, lithium hydroxide monohydrate and phosphoric acid ($H_3PO_4$ produced by Wako Chem. Ltd.) is added to deionized water to provide a 10 wt % $LiH_2PO_4$ aqueous solution. 2 kilos of a mixture of Core_3 powder and $Co_3O_4$ (with D50~3.5 μm) materials in a molar ratio of Co(Core_3)/Co($Co_3O_4$)=0.8696/0.1304 are placed in a tumbling fluidized coating apparatus (MP-01 mini from Powrex Corp.). The aqueous solution of $LiH_2PO_4$ is sprayed and dried on the surface of the powderous materials mixture under 90° C. hot air. The powderous materials mixture is fluidized by a rotating blade (300 rpm) and air flow of 0.4 $Nm^3$/min. The as prepared solution is fed to a spray nozzle with a constant rate of 5 g/min. and sprayed with an atomized air of 60 L/min. Because the powderous materials mixture is fluidized by hot air during spraying, the aqueous solvent of the spraying solution vaporizes immediately. The as-prepared sample is referred to as Core_4. SEM images of Core_4 samples are shown on FIG. 6b, and show that Core_3 particles are homogeneously covered by a homogeneous film of "$LiPO_3$" or "$LiH_2PO_4$".

Next, sample 2a is prepared as follows. Powder of Core_4 materials is mixed with MgO, $TiO_2$ and $Al_2O_3$ in order to achieve an overall Co/Ti/Mg/Al molar composition of 0.9919/0.0035/0.0028/0.0018. Next, 95.48 wt % of the above described mixture and 4.52 wt % of $Li_2CO_3$ are further blended together. The as-prepared blend is put in a ceramic crucible and fired at 980° C. for 10 h in air. The sintered product is then crushed and classified, resulting in sample 2a. FIG. 6c shows the SEM image of sample 2a. ICP data of sample 2a are listed on Table 2.

Sample 2b is prepared as follows: Core_3 powder and $Co_3O_4$ (with D50~3.5 μm) materials are mixed in a molar ratio of Co(Core_3)/Co($Co_3O_4$)=0.8696/0.1304 (equivalent to a weight ratio of 0.8905/0.1095 when a cobalt weight content of 60.21% and 73.42% are considered for Core_3 and $Co_3O_4$, respectively). MgO, $TiO_2$ and $Al_2O_3$ are further added in order to achieve an overall Co/Ti/Mg/Al molar composition of 0.9919/0.0035/0.0028/0.0018. The composition in Mg, Ti and Al dopants is identical to sample 2a. Next, 96.94 wt % of the above described mixture and 3.06 wt % of $Li_2CO_3$ are further blended together. The as-prepared blend is put in a ceramic crucible and fired at 980° C. for 10 h in air. The sintered product is then crushed and classified, resulting in sample 2b. ICP data of sample 2b are listed on Table 2; the Li:(Co+3P) and Li:(Co+3P+Al+Mg+Ti) molar ratios are very close to sample 2a, allowing a reliable comparison of their physical and electrochemical properties.

Figure 7:
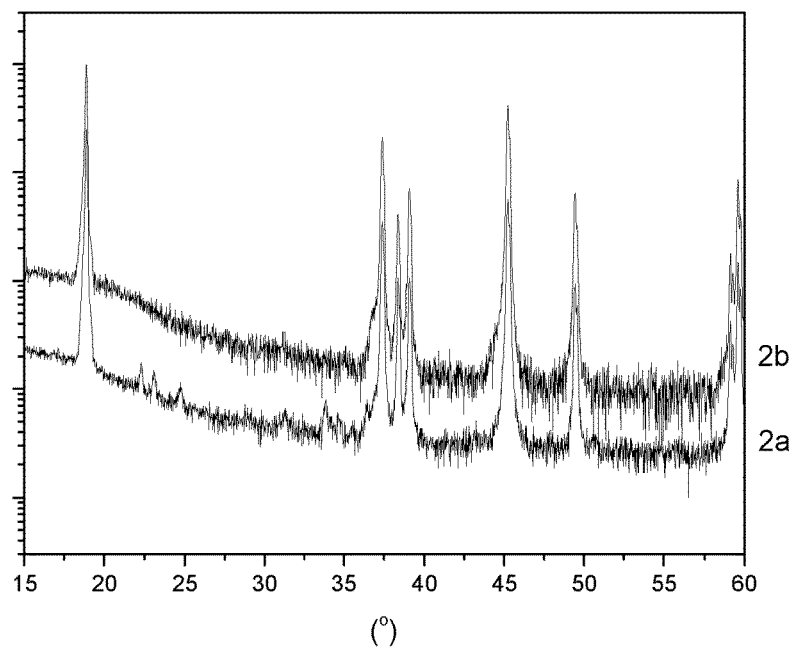
FIG. 7: XRD pattern of samples 2a (bottom line) and 2b (top line)

FIG. 7 shows the XRD pattern of samples 2a and 2b. Both XRD patterns show the reflections of typical O3-layered lithium cobalt oxide (space group R-3m). Traces of $Co_3O_4$ spinel impurities are observed in both samples and are estimated below 0.5 wt %. The presence of similar amounts of $Co_3O_4$ impurity shows that the lithium content is very similar in both samples, and that both samples are slightly Li-sub-stoichiometric in a well-controlled fashion. Sample 2a's XRD pattern shows the presence of a well crystallized $Li_3PO_4$ phase in the sample. From XRD analyses, it is concluded that sample 2b only differs from sample 2a by the absence of crystalline $Li_3PO_4$ attached to its surface. The conductivity of sample 2a and 2b are $1.78 \times 10^{-5}$ S/cm and $5.63 \times 10^{-5}$ S/cm respectively. In both cases, coincell 0.1 C and 1 C energy fading were excellent, sample 2a fading rates being 14.4% and 33.8% per 100 cycles, respectively and sample 2b fading rates being 22.1% and 46.5% per 100 cycles, respectively.

Figure 8:
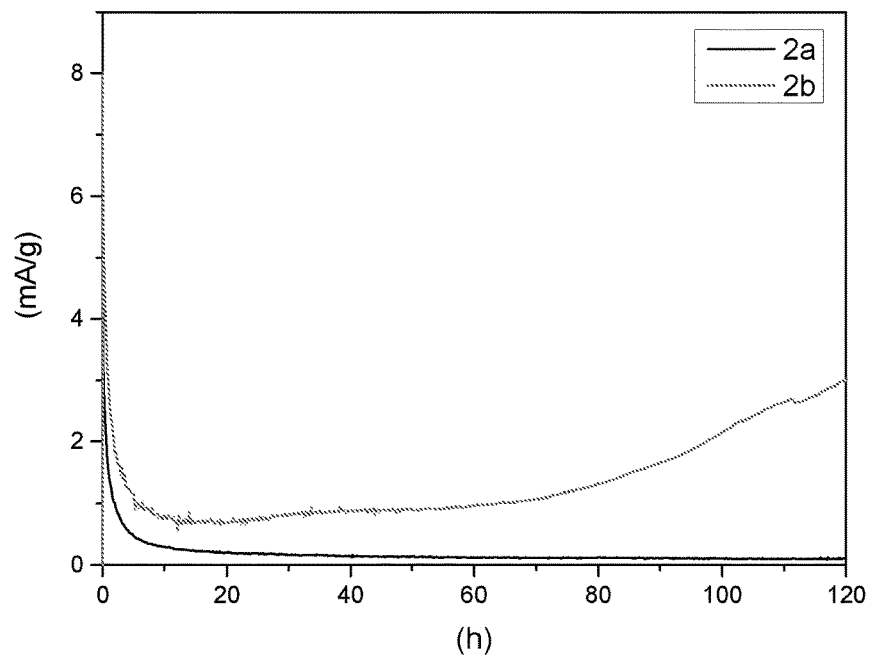
FIG. 8: evolution of float current (mA/g) as function of time for samples 2a (bottom line) and 2b (top line)

FIG. 8 shows the evolution of float current I(t) between t=0 hours and t=120 hours for samples 2a (lower line) and 2b (upper line). Table 5 lists the float capacity in mAh/g, calculated by integrating the float current between 0 and 120 hours, and the Co-dissolution measured by ICP-OES on the anode and on the separator in contact with the anode. Sample 2a shows 6.2 times lower float capacity and about 100 times lower Co-dissolution compared to sample 2b.

Figure 9A:
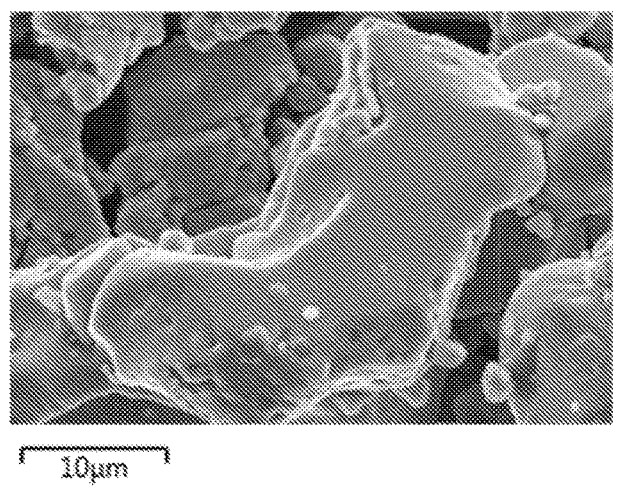
Figures 9B, 9C:
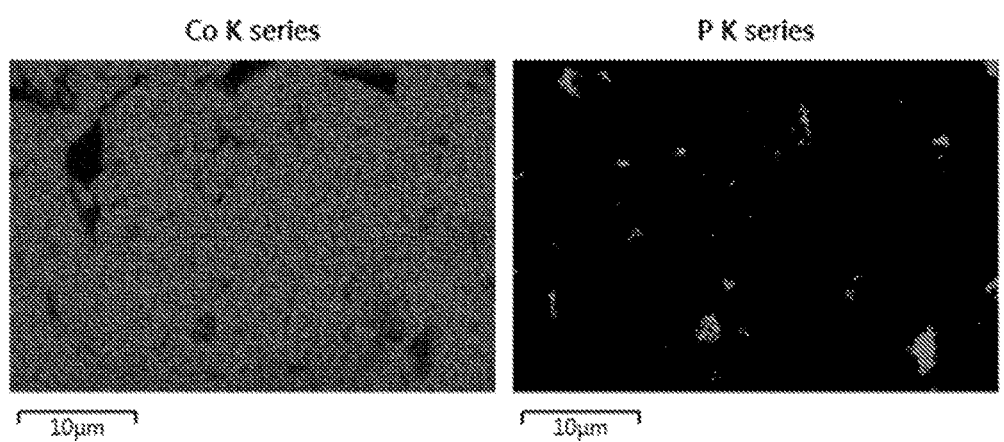
Figure 10:
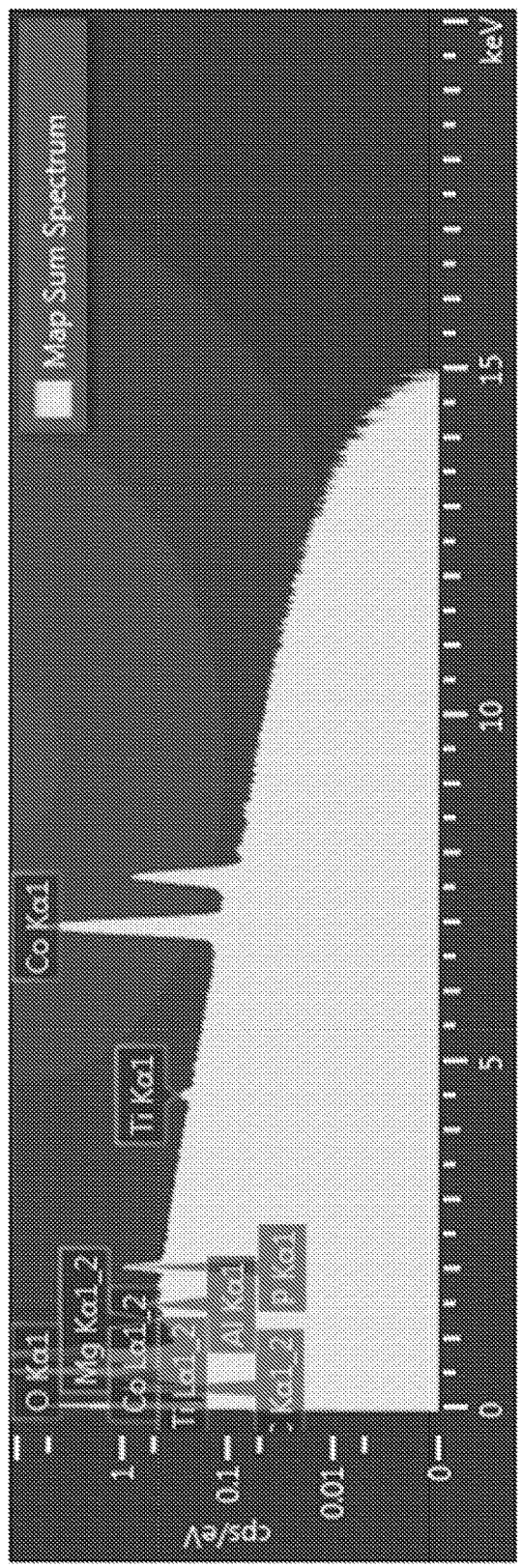

EDS surface mapping is performed for sample 2a on a $30 \times 40$ $\mu m^2$ surface. FIGS. 9a, b and c show the sample surface where the EDS mapping is performed. The spatial distribution in Co and P elements are shown on FIGS. 9b and c. FIG. 10 shows the map sum spectrum for the investigated surface. Domains rich in phosphorus appear to be separated, but densely attached, to the surface of lithium cobalt oxide particles. This SEM/EDS observation is in line with XRD and reveals the presence of $Li_3PO_4$ domains densely attached on the surface of lithium cobalt oxide particles.

Figure 14:
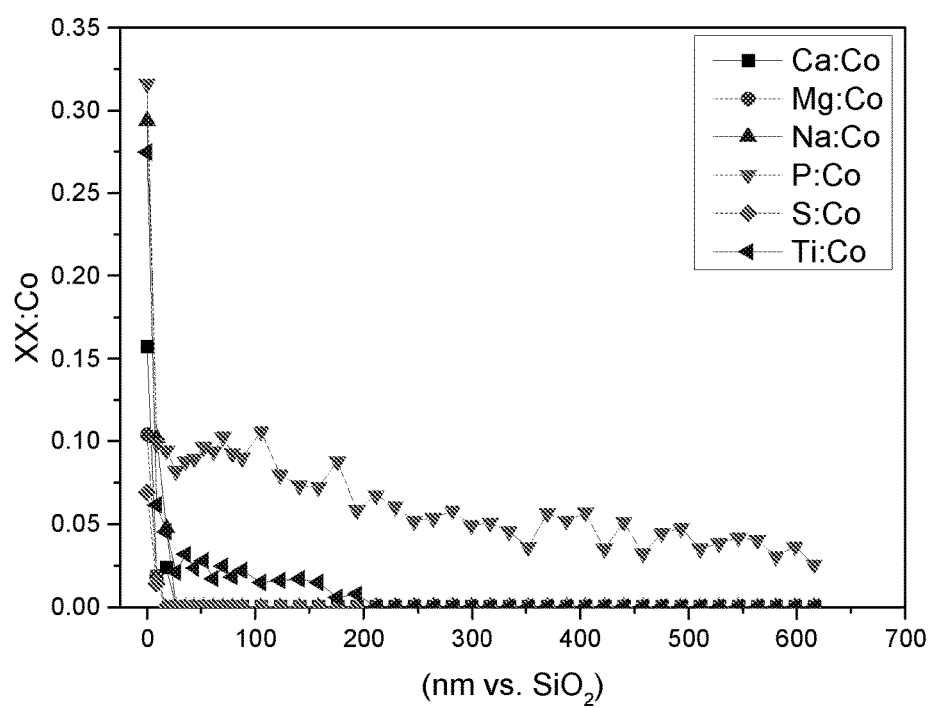
FIG. 14: XPS depth profiling of sample 2a. The element content XX=[Ca, Mg, Na, P, S, Ti] over Co molar ratio is plotted as function of depth (sputter rate vs. $SiO_2$ and equal to 8.8 nm/min).

XPS analysis is performed on sample 2a in the same way as for sample 1c. Results for sample 2a are shown on Table 6 and FIG. 14. Likewise, surface analysis and depth profiling shows that Mg and Ti atomic distributions are not homogeneous and are segregated: the surface of the particles of sample 2a is enriched in Mg (until 25 nm) and Ti (until 200 nm) compared to the core. The phosphate distribution decreases rapidly between 0 and 25 nm depth and then monotonously until 600 nm, the core of the material having a P to Co molar ratio below 0.05 mol/mol. The fast initial decrease could possibly be explained by a very thin layer of phosphate compound, such as $Li_3PO_4$, homogeneously covering the surface; the typical thickness is thought to be below 20 nm and possibly in the range of 0.01 to 10 nm. The linear decrease between 50 and 600 nm is most likely resulting from large $Li_3PO_4$ particles attached on the surface of sample 2a, as evidenced by SEM, EDS mapping and XRD.

Example 3

This example will demonstrate that the morphology of the $Li_3PO_4$ coating applied onto the surface of $LiCoO_2$-based particles is affected by the selection of the annealing temperature. At temperatures below 850° C. the $LiCoO_2$-based particles are covered with a continuous $Li_3PO_4$ layer. At temperatures above 850° C. the $LiCoO_2$-based particle surface comprises $Li_3PO_4$ islands; the presence of a continuous protective film between $Li_3PO_4$ islands is presumed from the very smooth particle surface in-between the islands.

2 mol % $Li_3PO_4$ is applied on the surface of a 25 μm $LiCoO_2$-based core. FIG. 11 shows the particle surface before (Sample 3a) and after $Li_3PO_4$ coating (Sample 3ac). 100 g of the as-prepared mixture is then annealed at 700° C. for 10 h in dry air and cooled down to room temperature. The product is milled and classified, resulting in sample 3b. Sample 3c is prepare in a similar way as sample 3b, except that the annealing temperature is set to 800° C. Sample 3d is prepared in a similar way as sample 3b except that the annealing temperature is set to 900° C. Sample 3e is prepared in a similar way as sample 3b except that the annealing temperature is set to 980° C.

Figure 12:
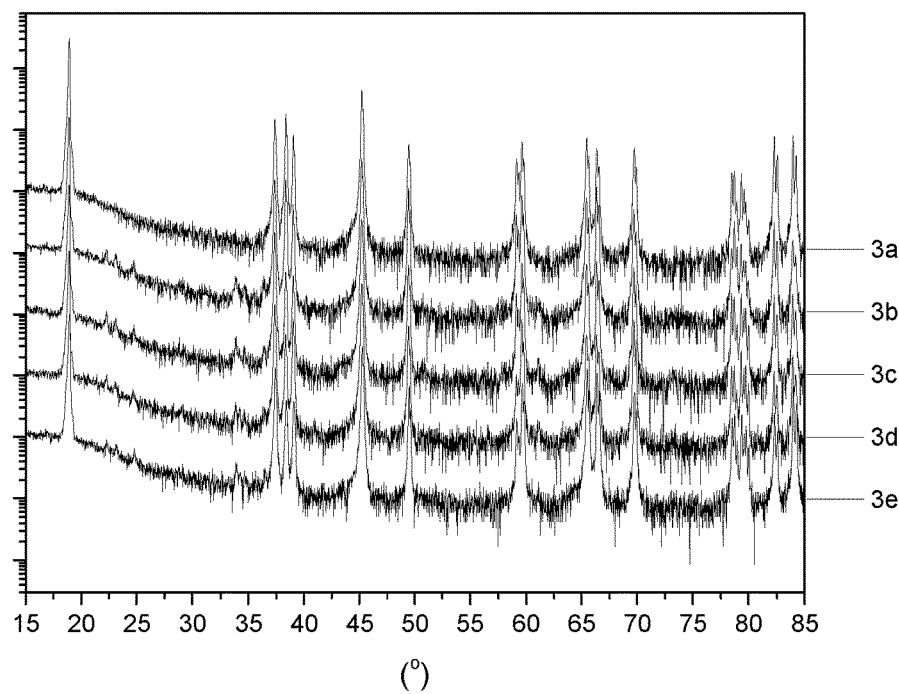
FIG. 12: XRD patterns of samples 3a, 3b, 3c, 3d and 3e. Intensity is displayed in $Log_{10}$ scale as function of the diffracted angle in 2θ (Degrees)

FIG. 12 shows the XRD patterns of samples 3a to 3e. Table 7 summarizes the lattice parameters of the O3 layered phase with space group R-3m and the $Li_3PO_4$ phase obtained from Rietveld refinement method. SEM images of sample 3ac and samples 3a to 3e are shown on FIG. 11. Sample 3ac particle's surface is homogeneously and continuously covered by flakes of $Li_3PO_4$. Increasing the heat treatment from 700° C. to 980° C. allows crystallizing and densifying the $Li_3PO_4$ compounds attached to the particle surface until coalescing occurs, with the formation of islands. As shown previously in Example 1; the presence of a thin continuous layer of $Li_3PO_4$ on the surface of particles and between $Li_3PO_4$ islands can be expected after $Li_3PO_4$ island formation, based on the very smooth particle surface in-between the islands.

Tables:

TABLE 1 physical and chemical properties of Core_1 and Core_2 and samples 1a to 1g.

| Sample | Conductivity S/cm | SBC (μmol/g) | LiOH (wt %) | $Li_2CO_3$ (wt %) | D5 (μm) | D50 (μm) | D90 (μm) | Pressed density (g/cm³) | BET (m²/g) |
|---|---|---|---|---|---|---|---|---|---|
| Core_1 | 2.70E−03 | 81.7 | 0.1139 | 0.1261 | 14.17 | 27.87 | 46.27 | 3.91 | 0.13 |
| Core_2 | 1.61E−03 | — | — | — | — | — | — | — | 0.41 |
| 1a | 7.10E−06 | 10.9 | 0.0046 | 0.0333 | 3.50 | 22.53 | 41.93 | 3.99 | — |
| 1b | 4.31E−06 | 10.3 | 0.0046 | 0.0308 | — | — | — | 3.99 | — |
| 1c | 2.83E−06 | 9.9 | 0.0002 | 0.0361 | 3.43 | 21.60 | 47.01 | 4.01 | 0.23 |
| 1d | 2.80E−05 | 11.0 | 0.0040 | 0.0346 | — | — | — | 4.01 | — |
| 1e | 1.26E−04 | 11.5 | 0.0032 | 0.0373 | — | — | — | 4.03 | — |
| 1f | 2.63E−03 | 28.9 | 0.0037 | 0.1010 | 3.13 | 21.89 | 47.37 | 4.05 | 0.23 |
| 1g | 4.32E−03 | 34.9 | 0.0067 | 0.1186 | — | — | — | 4.03 | — |

TABLE 2 chemical composition using ICP of samples 1a to 1g and 2a-2b. Experimental Li:Co and Li:(Co + 3P) ratios are calculated.

| Sample | Li (wt %) | Co (wt %) | P (wt %) | Ni (wt %) | Mn (wt %) | Al (wt %) | Ca (wt %) | Mg (wt %) | Na (wt %) | Ti (wt %) | $\frac{Li}{Co}$ | $\frac{Li}{Co + 3P}$ | $\frac{Li}{Co + Mg + Al + Ti + 3P}$ |
|---|---|---|---|---|---|---|---|---|---|---|---|---|---|
| 1a | 7.06 | 59.59 | 0.24 | 0.025 | 0.004 | 0.006 | 0.010 | 0.12 | 0.009 | 0.12 | 1.006 | 0.983 | 0.976 |
| 1b | 7.09 | 59.54 | 0.24 | 0.025 | 0.004 | 0.007 | 0.011 | 0.12 | 0.009 | 0.12 | 1.012 | 0.989 | 0.982 |
| 1c | 7.12 | 59.57 | 0.24 | 0.025 | 0.004 | 0.007 | 0.011 | 0.12 | 0.010 | 0.12 | 1.015 | 0.992 | 0.985 |
| 1d | 7.17 | 59.23 | 0.24 | 0.024 | 0.003 | 0.007 | 0.011 | 0.12 | 0.009 | 0.12 | 1.028 | 1.004 | 0.997 |
| 1e | 7.17 | 59.15 | 0.24 | 0.024 | 0.003 | 0.007 | 0.011 | 0.12 | 0.010 | 0.12 | 1.029 | 1.005 | 0.998 |
| 1f | 7.22 | 59.16 | 0.24 | 0.024 | 0.003 | 0.007 | 0.011 | 0.12 | 0.010 | 0.12 | 1.036 | 1.012 | 1.005 |
| 1g | 7.34 | 59.33 | 0.24 | 0.025 | 0.003 | 0.006 | 0.011 | 0.12 | 0.009 | 0.12 | 1.050 | 1.026 | 1.019 |
| 2a | 7.30 | 59.59 | 0.54 | 0.030 | 0.011 | 0.060 | 0.006 | 0.09 | 0.012 | 0.15 | 1.041 | 0.989 | 0.980 |
| 2b | 7.10 | 61.18 | 0.00 | 0.024 | 0.003 | 0.075 | 0.014 | 0.08 | 0.012 | 0.14 | 0.986 | 0.986 | 0.977 |

TABLE 3 coincell properties of Core_1 and Core_2 and samples 1a to 1g.

| Sample | CQ_1 (mAh/g) | DQ_1 (mAh/g) | QIrr. (%) | 3C rate (%) | DQ_7 (mAh/g) | QFad. 1C (%) | EFad. 0.1C (%) | EFad. 1C (%) |
|---|---|---|---|---|---|---|---|---|
| Core_1 | 163.2 | 154.6 | 5.3% | 84.5% | 198.2 | 124.8 | 101.0 | 151.9 |
| Core_2 | 160.8 | 152.8 | 5.0% | 84.2% | 195.7 | 370.4 | 248.6 | 384.1 |
| 1a | 160.9 | 158.4 | 1.5% | 90.8% | 219.6 | 14.4 | 6.4 | 16.9 |
| 1b | 160.0 | 157.5 | 1.6% | 90.8% | 219.3 | 11.7 | 4.6 | 12.5 |
| 1c | 161.1 | 158.5 | 1.6% | 90.8% | 220.8 | 13.1 | 6.2 | 14.1 |
| 1d | 163.0 | 158.9 | 2.5% | 88.7% | 226.9 | 56.4 | 49.0 | 63.9 |
| 1e | 162.4 | 157.8 | 2.9% | 87.7% | 225.5 | 62.9 | 52.9 | 71.3 |
| 1f | 161.4 | 155.5 | 3.6% | 87.7% | 218.9 | 131.7 | 109.3 | 157.0 |
| 1g | 162.7 | 154.8 | 4.8% | 88.0% | 210.6 | 205.5 | 156.8 | 235.6 |

TABLE 4 coincell schedule.

| Type | Cycle number "n" | Charge | | | | Discharge | | | |
|---|---|---|---|---|---|---|---|---|---|
| | | C Rate | End Current | Rest (min) | V/Li metal (V) | C Rate | End Current | Rest (min) | V/Li metal (V) |
| Part I: Rate performance 4.3 V~3.0 V | 1 | 0.10 | — | 30 | 4.3 | 0.10 | — | 30 | 3.0 |
| | 2 | 0.25 | 0.05 C | 10 | 4.3 | 0.20 | — | 10 | 3.0 |
| | 3 | 0.25 | 0.05 C | 10 | 4.3 | 0.50 | — | 10 | 3.0 |
| | 4 | 0.25 | 0.05 C | 10 | 4.3 | 1.00 | — | 10 | 3.0 |
| | 5 | 0.25 | 0.05 C | 10 | 4.3 | 2.00 | — | 10 | 3.0 |
| | 6 | 0.25 | 0.05 C | 10 | 4.3 | 3.00 | — | 10 | 3.0 |
| Part II: 1C cycle life 4.6 V~3.0 V | 7 | 0.25 | 0.1 C | 10 | 4.6 | 0.10 | — | 10 | 3.0 |
| | 8 | 0.25 | 0.1 C | 10 | 4.6 | 1.00 | — | 10 | 3.0 |
| | 9~30 | 0.25 | — | 10 | 4.6 | 0.50 | — | 10 | 3.0 |
| | 31 | 0.25 | 0.1 C | 10 | 4.6 | 0.10 | — | 10 | 3.0 |
| | 32 | 0.25 | 0.1 C | 10 | 4.6 | 1.00 | — | 10 | 3.0 |

TABLE 5 float capacity and Co dissolution.

| Sample | Float capacity (mAh/g) | Co-dissolution (mg) |
|---|---|---|
| 2a | 26 | 0.002 |
| 2b | 162 | 0.339 |

TABLE 6 surface composition in atomic percent (at %) of samples measured by XPS.

| Element | Al 2s | C 1s | | Ca 2p | Co $2p_{1/2}$ | Li 1s | Mg 2p | Na 1s | O 1s | | P 2p | S 2p | Si 2p | Ti 2p |
|---|---|---|---|---|---|---|---|---|---|---|---|---|---|---|
| Peak position (eV) | 118 | 284.8 | 289.3 | 347 | 795 | 54.3 | 49.5 | 1072 | 529.6 | 531.3 | 133.6 | 169 | 153 | 458 |
| Most likely chemical assignment | $AlO_x$ | $C_xH_y$ | $CO_3^{2-}$ | | $CoO_x$ | $Li^+$ | MgO | | | | —$PO_4$ | —$SO_4$ | $SiO_x$ | $TiO_2$ |
| Sample 1c (at %) | — | 6.6 | 2.5 | 1.7 | 8.9 | 13.7 | 1.4 | 3.2 | 24.2 | 32.5 | 2.5 | 0.7 | — | 2.0 |
| Sample 2a (at %) | — | 7.1 | 2.4 | 1.1 | 9.4 | 13.6 | 1.4 | 3.5 | 26.2 | 30.6 | 2.1 | 0.4 | — | 2.2 |

TABLE 7

($a_1$, $b_1$, $c_1$) lattice parameters of $Li_3PO_4$ phase (space group Pmnb) and ($a_h$, $c_h$) lattice parameters of the O3 hexagonal layered main phase (space group R-3m) in samples 3a, 3b, 3c, 3d and 3e

| Sample | $a_1$ (Å) | $b_1$ (Å) | $c_1$ (Å) | $a_h$ (Å) | $c_h$ (Å) |
|---|---|---|---|---|---|
| 3a | — | — | — | 2.817 | 14.057 |
| 3b | 6.121 | 10.482 | 4.930 | 2.816 | 14.058 |
| 3c | 6.122 | 10.482 | 4.925 | 2.817 | 14.057 |
| 3d | 6.125 | 10.483 | 4.930 | 2.816 | 14.057 |
| 3e | 6.120 | 10.485 | 4.924 | 2.816 | 14.056 |

The invention claimed is:

1. A layered lithium metal oxide powder for a cathode material used in a rechargeable battery, with the general formula $(1-x)[Li_{a-b}A_b]_{3a}[Co_{1-c}M_c]_{3b}[O_{2-d-e}N'_e]_{6c} \cdot xLi_3PO_4$, with $0.0001 < x < 0.05$, $0.90 < a < 1.10$, $0 < b+c < 0.1$, $-0.1 < d < 0.1$ and $e < 0.05$, wherein the Li to Co+A+M+3P molar ratio is between 0.970 and 1.005, wherein A and M comprise one or more elements including at least one element selected from the group consisting of Mg, Ti and Al; wherein N' comprises one or more dopants selected from the group consisting of F, S, N and P; wherein the powder comprises a core having a layered crystal structure comprising the elements Li, Co and oxygen and having a molar ratio P to Co between 0 and less than 0.05, a surface layer comprising a mixture of the elements Li, Co and oxygen, oxides comprising one or more elements selected from the group consisting of Mg, Ti and Al, and $Li_3PO_4$, wherein the oxides optionally further comprise one or both of Li and Co, and the mixture further comprising a plurality of ion conductive $Li_3PO_4$ particles in the form of discrete particles densely attached to the core.

2. The lithium metal oxide powder of claim 1, wherein $0.970 \le [((1-x) \cdot (a-b))+3x]/[((1-x) \cdot (1+b))+3x] \le 1.000$.

3. The lithium metal oxide powder of claim 1, wherein $0.970 \le [((1-x) \cdot (a-b))+3x]/[((1-x) \cdot (1+b))+3x] \le 0.990$.

4. The lithium metal oxide powder of claim 1, wherein $Li_3PO_4$ is attached to a surface of the core in a combination of a film layer and discrete particles, thereby creating an ion-conductive electron-insulating surface layer on the core.

5. The lithium metal oxide powder of claim 1, wherein discrete particles of the $Li_3PO_4$ have a size below 5 μm.

6. The lithium metal oxide powder of claim 4, wherein the $Li_3PO_4$ present as a film layer covers at least 50% of the surface of the core.

7. The lithium metal oxide powder of claim 4, wherein a thickness of the film layer is less than 10 nm.

8. The lithium metal oxide powder of claim 1, wherein the $Li_3PO_4$ is a crystalline compound.

9. The lithium metal oxide powder of claim 1, wherein the $Li_3PO_4$ has up to 25 at % nitrogen doping on oxygen site.

10. The lithium metal oxide powder of claim 4, wherein a thickness of the ion-conductive electron-insulating surface layer, defined as the depth where the molar ratio of (A+M)/Co>(2·(b+c))/(1-c) mol/mol, as determined by XPS, is 1 μm or less.

11. The lithium metal oxide powder of claim 10, wherein the thickness of the ion-conductive electron-insulating surface layer is 0.5 μm or less.

12. The lithium metal oxide powder of claim 1, wherein A further comprises at least one element selected from the group consisting of Na, Si, S, K, Ca, V, Cr, Mn, Fe, Ni, Cu, Zn, Sr, Nb, Zr, W, F and rare earth metals.

13. The lithium metal oxide powder of claim 1, wherein M further comprises at least one element selected from the group consisting of Li, Na, Si, S, K, Ca, V, Cr, Mn, Fe, Ni, Cu, Zn, Sr, Nb, Zr, W, F and rare earth metals.

14. The lithium metal oxide powder of claim 1, wherein electronic conductivity of the powder at room temperature is below $10^{-3}$ S/cm.

15. The lithium metal oxide powder of claim 1, wherein the P/Co molar ratio is between 0.01 and 5 mol %.

16. The lithium metal oxide powder of claim 1, wherein the Li/(Co+3P) molar ratio is between 0.980 and 1.020.

17. The lithium metal oxide powder of claim 1, having a soluble base content <20 μmol/g.

18. A method for manufacturing the lithium metal oxide powder of claim 1, comprising:

providing a first mixture of a first Co— or Co, A and M-comprising precursor powder and a first Li-comprising precursor powder, the first mixture having a Li:Co molar ratio >1.02, sintering the first mixture in an oxygen comprising atmosphere at a temperature T1 of at least 350° C., thereby obtaining a Li-enriched lithium metal oxide compound, providing a second Co— or Co, A and M-comprising precursor powder and a phosphate containing reagent, mixing the Li-enriched lithium metal oxide compound, the second Co— or Co, A and M-comprising precursor powder, and the phosphate containing reagent, thereby obtaining a second mixture wherein the Li to Co+A+M+3P molar ratio is between 0.970 and 1.005, and sintering the second mixture in an oxygen comprising atmosphere at a temperature T2 of at least 600° C.

19. A method for manufacturing the lithium metal oxide powder of claim 1, comprising:

providing a first mixture of a first Co— or Co, A and M-comprising precursor powder, and a first Li-comprising precursor powder, the first mixture having a Li:Co molar ratio >1.02, sintering the first mixture in an oxygen comprising atmosphere at a temperature T1 of at least 350° C., thereby obtaining a Li-enriched lithium metal oxide compound, mixing the Li-enriched lithium metal oxide compound with phosphate and lithium containing reagents, precipitating $Li_3PO_4$ particles on the surface of the Li-enriched lithium metal oxide compound, thereby obtaining a second mixture, providing a second Co— or Co, A and M-comprising precursor powder, and mixing the second mixture and the second Co— or Co, A and M-comprising precursor powder, thereby obtaining a third mixture, whereby the third mixture has a Li to Co+A+M+3P molar ratio between 0.970 and 1.005, and sintering the third mixture in an oxygen comprising atmosphere at a temperature T2 of at least 600° C.

* * * * *